Apr. 24, 1923.

E. A. PIGEON

WIRE ASSEMBLING MACHINE

Filed May 8, 1920      12 sheets-sheet 1

1,452,615

Inventor
E. A. Pigeon
By Robert M Pierson
Atty.

Apr. 24, 1923.

E. A. PIGEON 1,452,615

WIRE ASSEMBLING MACHINE

Filed May 8, 1920 — 12 sheets-sheet 2

Inventor
E. A. Pigeon
By Robert W. Pierson
Atty.

Apr. 24, 1923.
E. A. PIGEON
WIRE ASSEMBLING MACHINE
Filed May 8, 1920
1,452,615
12 sheets-sheet 3
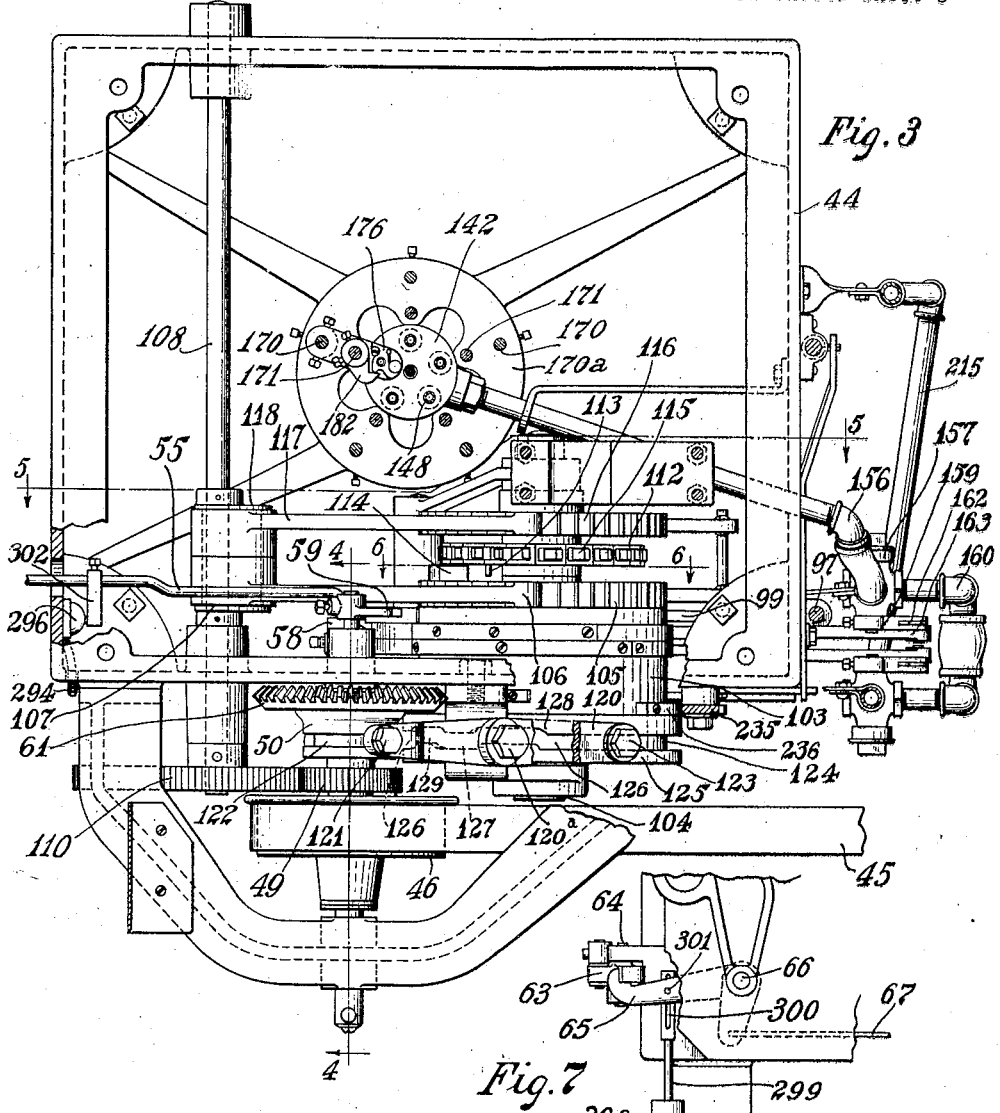
Fig. 3
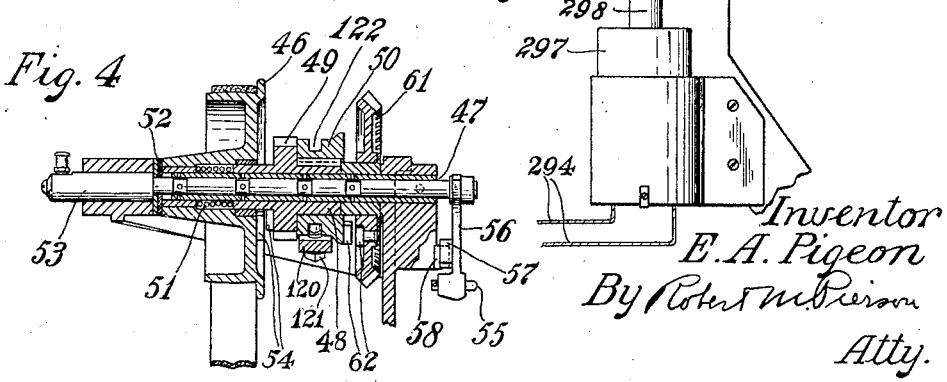
Fig. 4
Fig. 7
Inventor
E. A. Pigeon
By Robert M. Pierson
Atty.

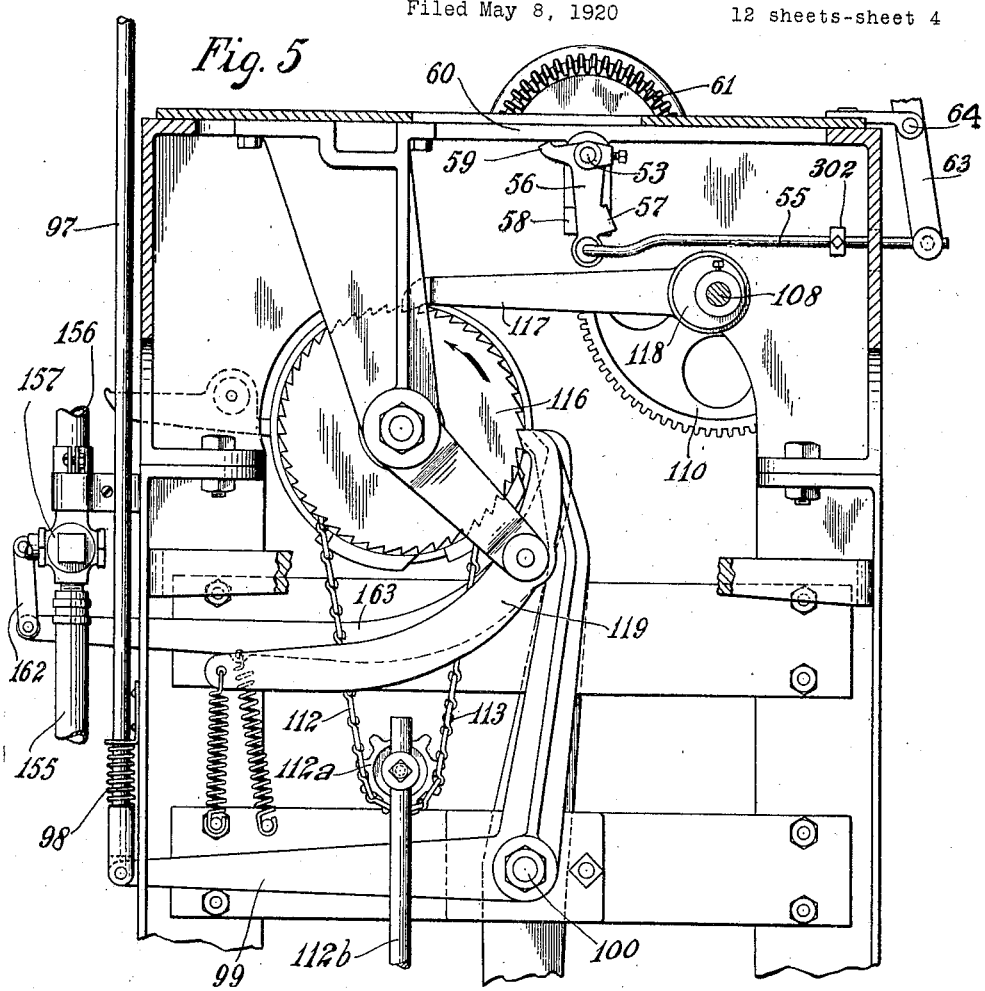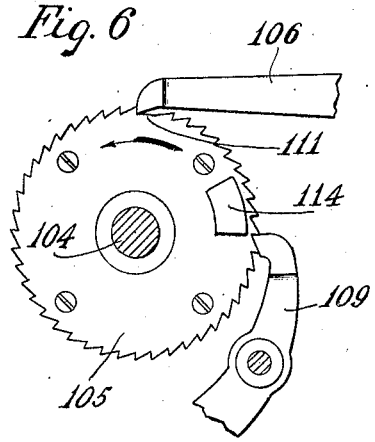

Apr. 24, 1923.
E. A. PIGEON
1,452,615
WIRE ASSEMBLING MACHINE
Filed May 8, 1920
12 sheets-sheet 5
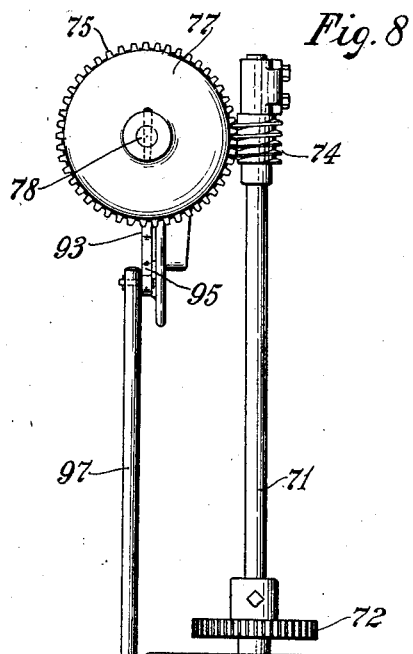
Fig. 8
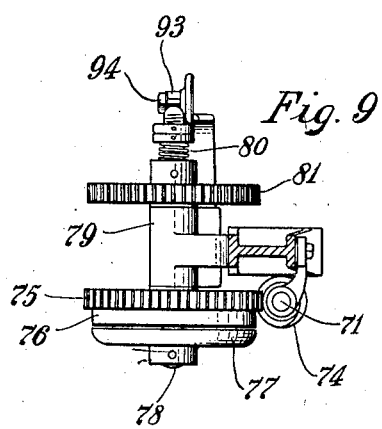
Fig. 9
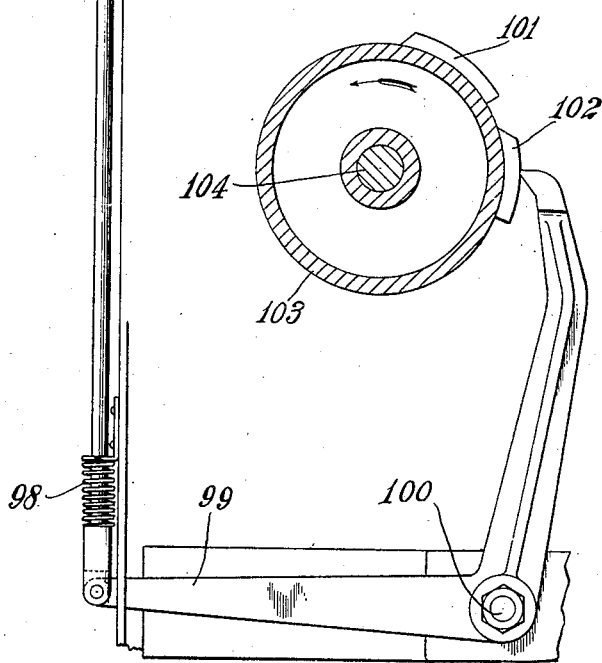
Inventor
E. A. Pigeon
By Robert M Pierson
Atty.

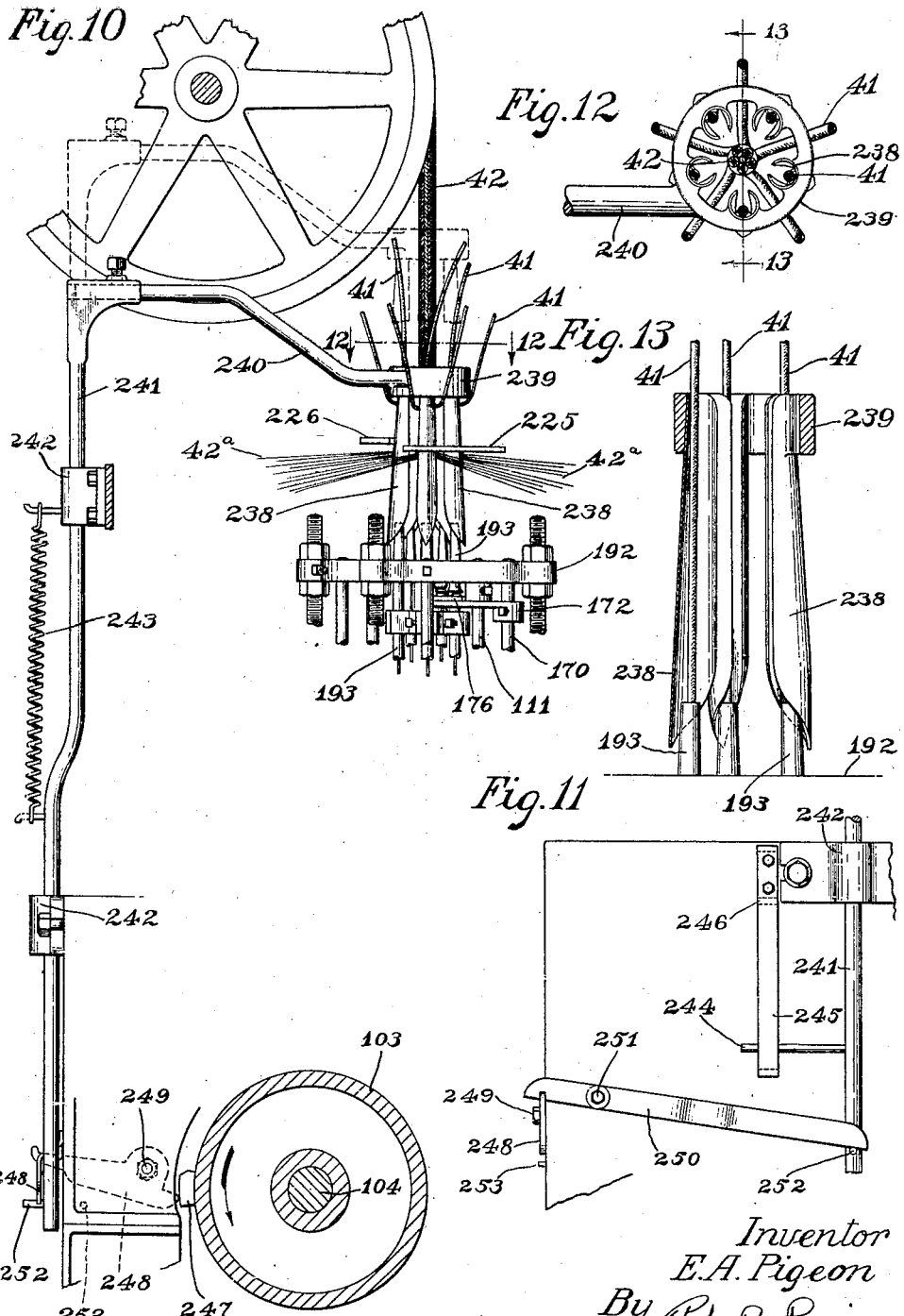

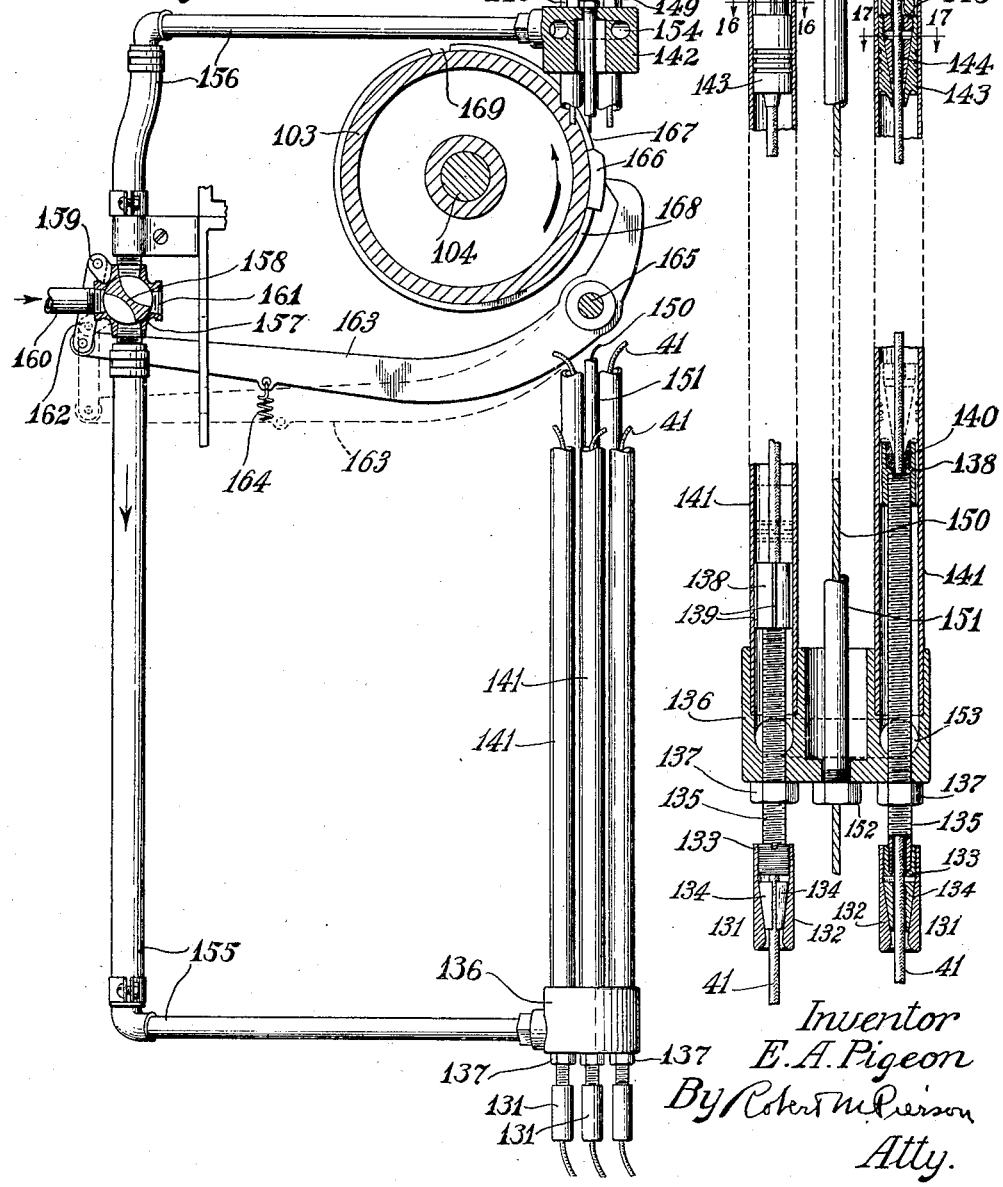

Apr. 24, 1923.　　　　　　　　　　　　　　　　　　　　　　　　1,452,615
E. A. PIGEON
WIRE ASSEMBLING MACHINE
Filed May 8, 1920　　　　12 sheets-sheet 8
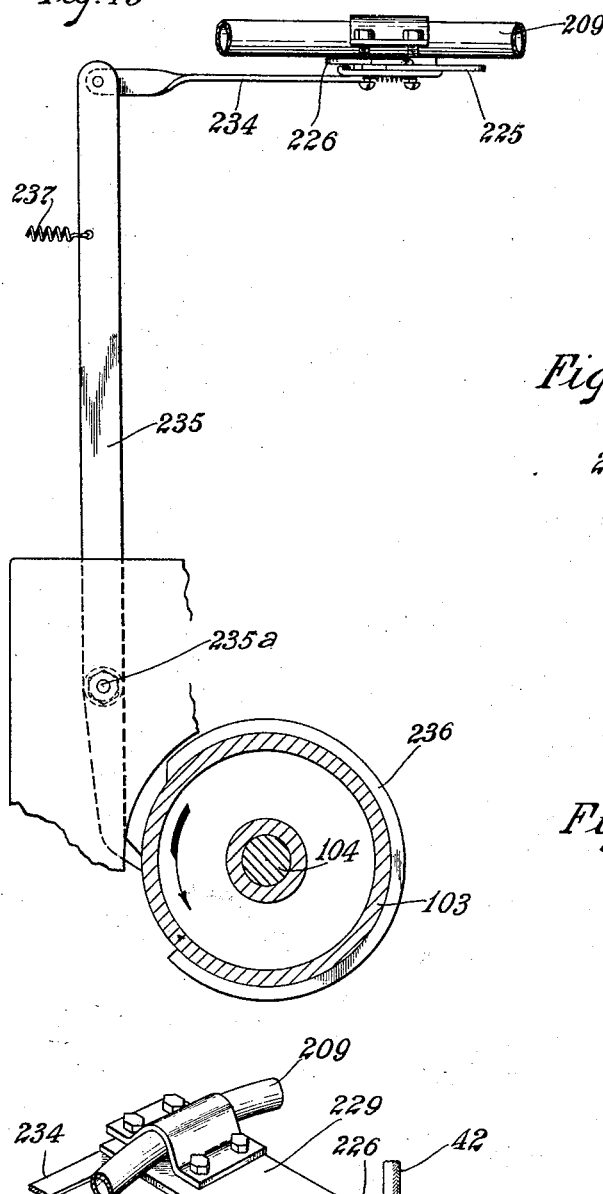
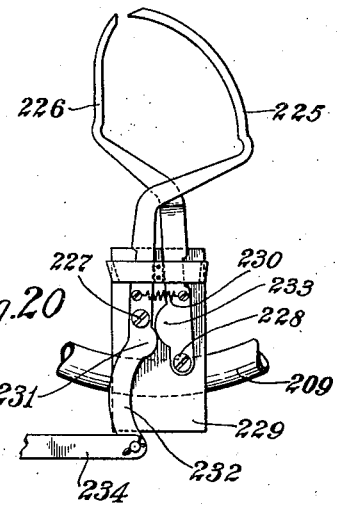
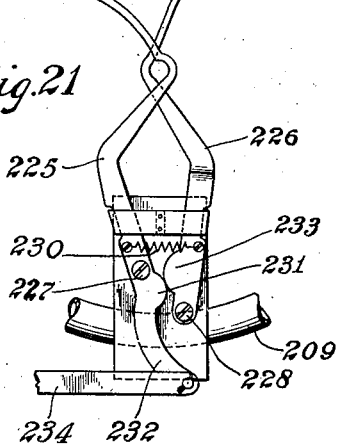
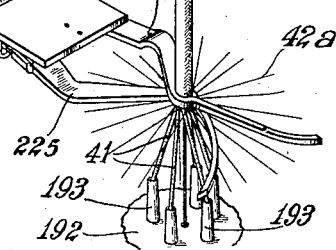
Inventor
E. A. Pigeon
By Robert M. Pierson
Atty.

Apr. 24, 1923.
E. A. PIGEON
WIRE ASSEMBLING MACHINE
Filed May 8, 1920
1,452,615
12 sheets-sheet 9
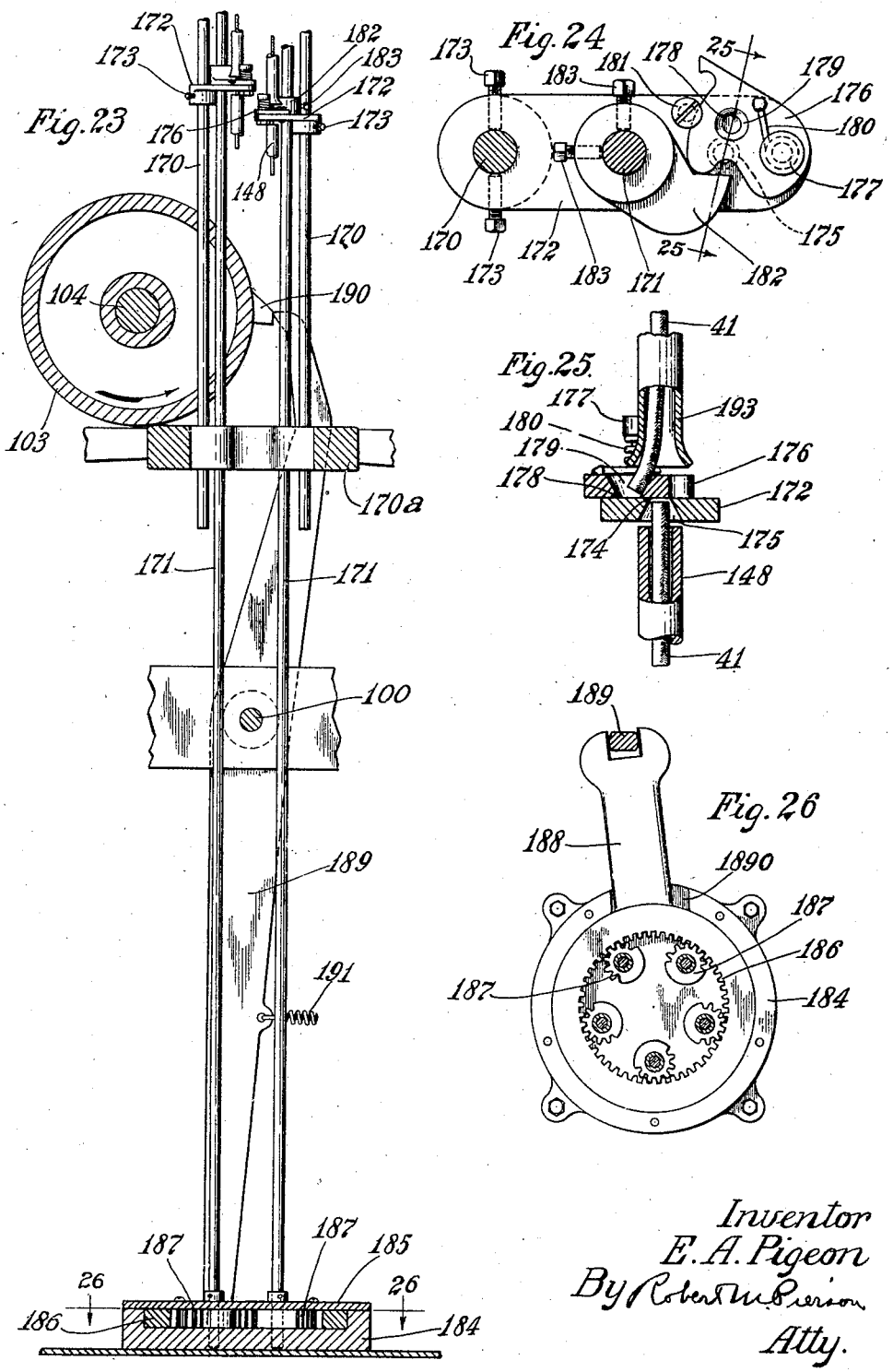
Inventor
E. A. Pigeon
By Robert M. Pierson
Atty.

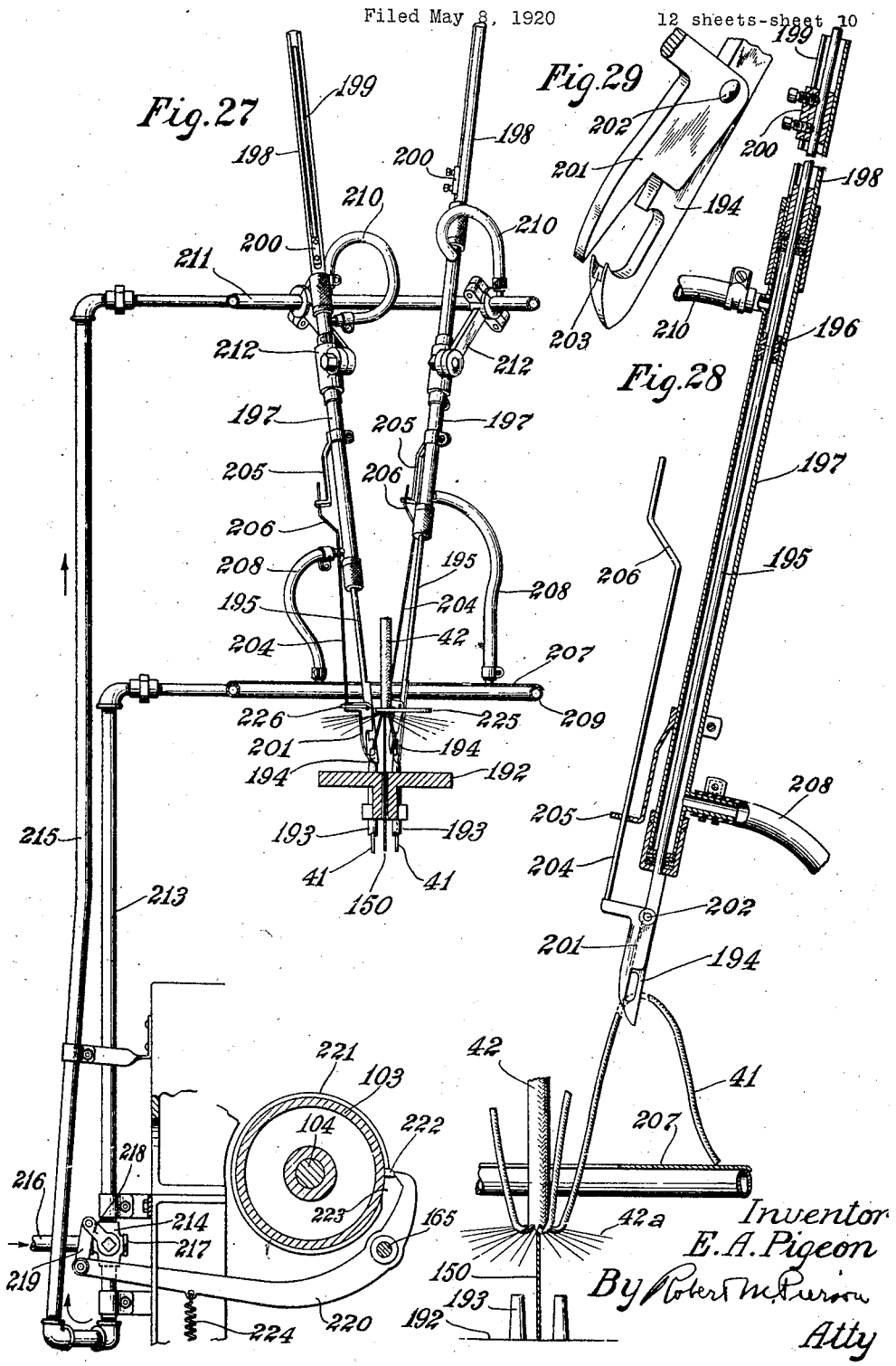

Apr. 24, 1923.

E. A. PIGEON 1,452,615

WIRE ASSEMBLING MACHINE

Filed May 8, 1920

Inventor
E. A Pigeon.
By Robert M Pierson
Atty.

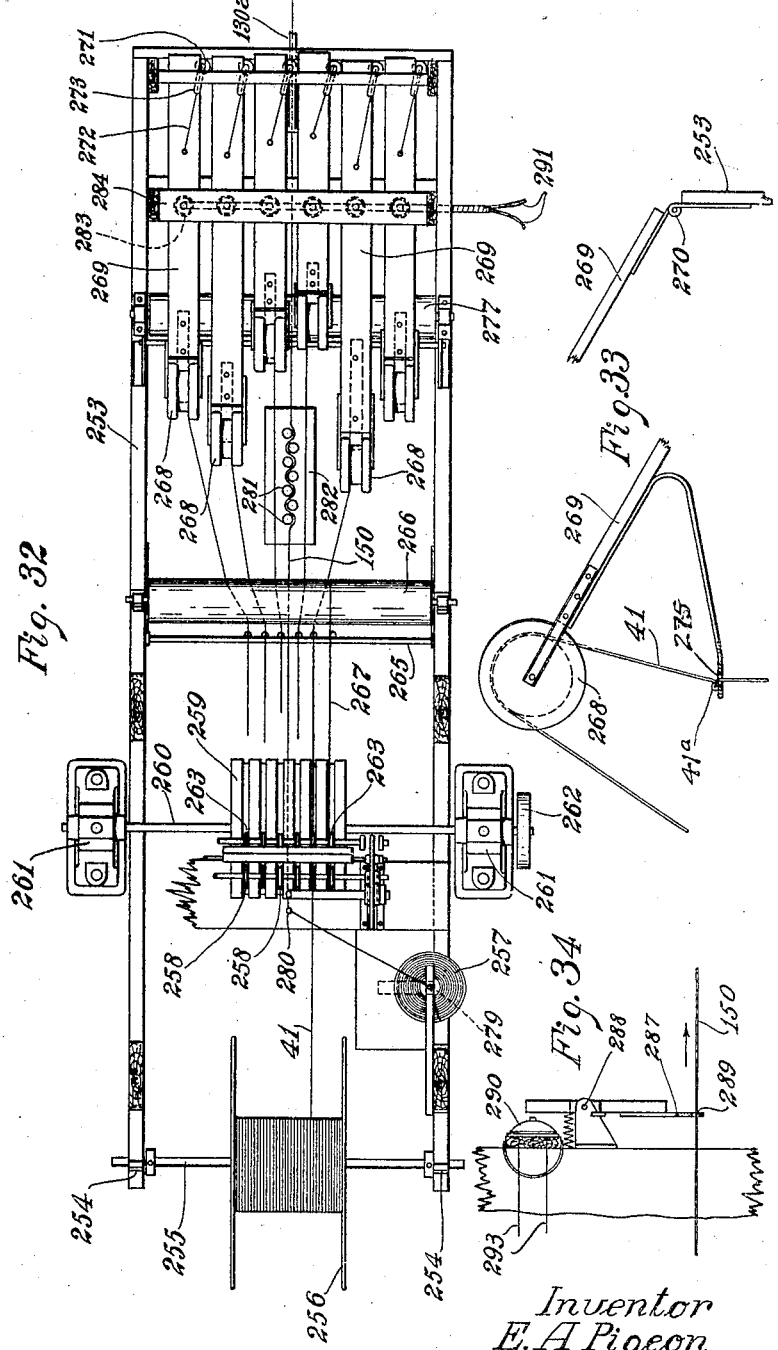

Patented Apr. 24, 1923.

1,452,615

UNITED STATES PATENT OFFICE.

ERNEST A. PIGEON, OF AKRON, OHIO, ASSIGNOR TO THE B. F. GOODRICH COMPANY, OF NEW YORK, N. Y., A CORPORATION OF NEW YORK.

WIRE-ASSEMBLING MACHINE.

Application filed May 8, 1920. Serial No. 379,806.

*To all whom it may concern:*

Be it known that I, ERNEST A. PIGEON, a citizen of the United States, residing at Akron, in the county of Summit and State of Ohio, have invented a certain new and useful Wire-Assembling Machine, of which the following is a specification.

This invention relates mainly to the manufacture of wire assemblies such as those used in the ignition and lighting circuits of automobiles, and it has for one of its objects to provide mechanism for automatically feeding and cutting off the wires to the desired lengths and relative end positions and applying to the bundle of wires a braided or other covering. These operations have heretofore been performed largely by hand, sometimes with the aid of stop gauges, cutting gauges and wire-holding devices, and it has generally required the services of two operators to do the work. With the apparatus of the present invention, one operator can fully attend to one or more machines, and there is a considerable increase of output, greater uniformity therein, and less waste of material as compared with prior methods of performing the work. A further object is to avoid the necessity for stopping the apparatus or interrupting the manufacturing operation at the completion of each assembled and braided unit, and this I accomplish by providing a novel chain or string of units and a novel method of manufacture whereby a completed unit may be utilized in feeding the next unit which is in course of manufacture.

Of the acompanying drawings:

Fig. 3 is a horizontal section on the line 3—3 of Fig. 1.

Fig. 4 is a section on the line 4—4 of Fig. 3 illustrating certain clutching devices.

Fig. 5 is a section on the line 5—5 of Fig. 3.

Fig. 6 is a section on the line 6—6 of Fig. 3.

Fig. 7 (Sheet 3) is a plan view of a solenoid and latch forming part of an automatic stop mechanism.

Fig. 8 is a side elevation, partly in section, showing the train of mechanism for controlling the operation of a wind-up, or large top wheel which pulls the work through the machine.

Fig. 9 is a plan view of said controlling mechanism.

Fig. 10 is a side elevation, partly in section, showing mainly a gang of vertically movable wire guides in their depressed position and the train of mechanism for operating them.

Fig. 11 is a front elevation showing a part of said operating mechanism.

Fig. 12 is a section of the line 12—12 of Fig. 10.

Fig. 13 is a section on the line 13—13 of Fig. 12.

Fig. 14 is a side elevation, partly in section, looking in the opposite direction from Figs. 8 and 10, showing the pneumatic devices and their controlling mechanism for automatically raising the individual wires.

Fig. 15 is a vertical section, partly broken away, showing two of the pneumatic cylinders and pistons and adjacent parts.

Figs. 16 and 17 are sections on the correspondingly numbered lines of Fig. 15.

Fig. 18 is a perspective view of one of the wire-gripper jaws.

Fig. 19 is a side elevation, partly in section, looking in the same direction as Figs. 8 and 10, showing the gathering jaws used at the braiding point and the train of mechanism for operating them.

Fig. 20 is a plan view of said jaws in their open position.

Fig. 21 is a similar view of the jaws in their closed position.

Fig. 22 is a perspective view of the work and the jaws with the latter in their closed position.

Fig. 23 is a side elevation, partly in section, looking from the same direction as Fig. 14, showing two of the wire cutters and their operating mechanism.

Fig. 24 is a plan view, partly in section, showing one of the wire cutters.

Fig. 25 is a section of said cutter on the line 25—25 of Fig. 24.

Fig. 26 is a section on the line 26—26 of Fig. 23.

Fig. 27 is a side elevation, partly in section, looking from the same direction as Fig. 14, showing two of the hook devices together with their pneumatic operating mechanism and the pneumatic controller for lifting and spreading the severed wire ends on the lower end of a braided unit to permit the braiding of the connection between said unit and the next succeding one.

Fig. 28 is a vertical section, partly in elevation, showing the work and one of said hook devices, together with its pneumatic cylinder.

Fig. 29 is a perspective view of one of the hooks and its latch.

Fig. 31 is a side elevation, partly broken away, showing the mechanism for automatically supplying the insulated wires and the central core to the wire assembling machine and automatically stopping said machine when a kink is encountered in any of said wires or core, or when one of the wires runs out, the electrical connections being shown diagrammatically in this view.

Fig. 32 is a plan view of said mechanism.

Fig. 33 is a side elevation, partly broken away and in section, showing one of the wire-controlled arms being swung downwardly by a kinked wire.

Fig. 34 is a side elevation of the electrical switch and its actuator controlled by the central core strand.

*List of main features.*

Figure 1:
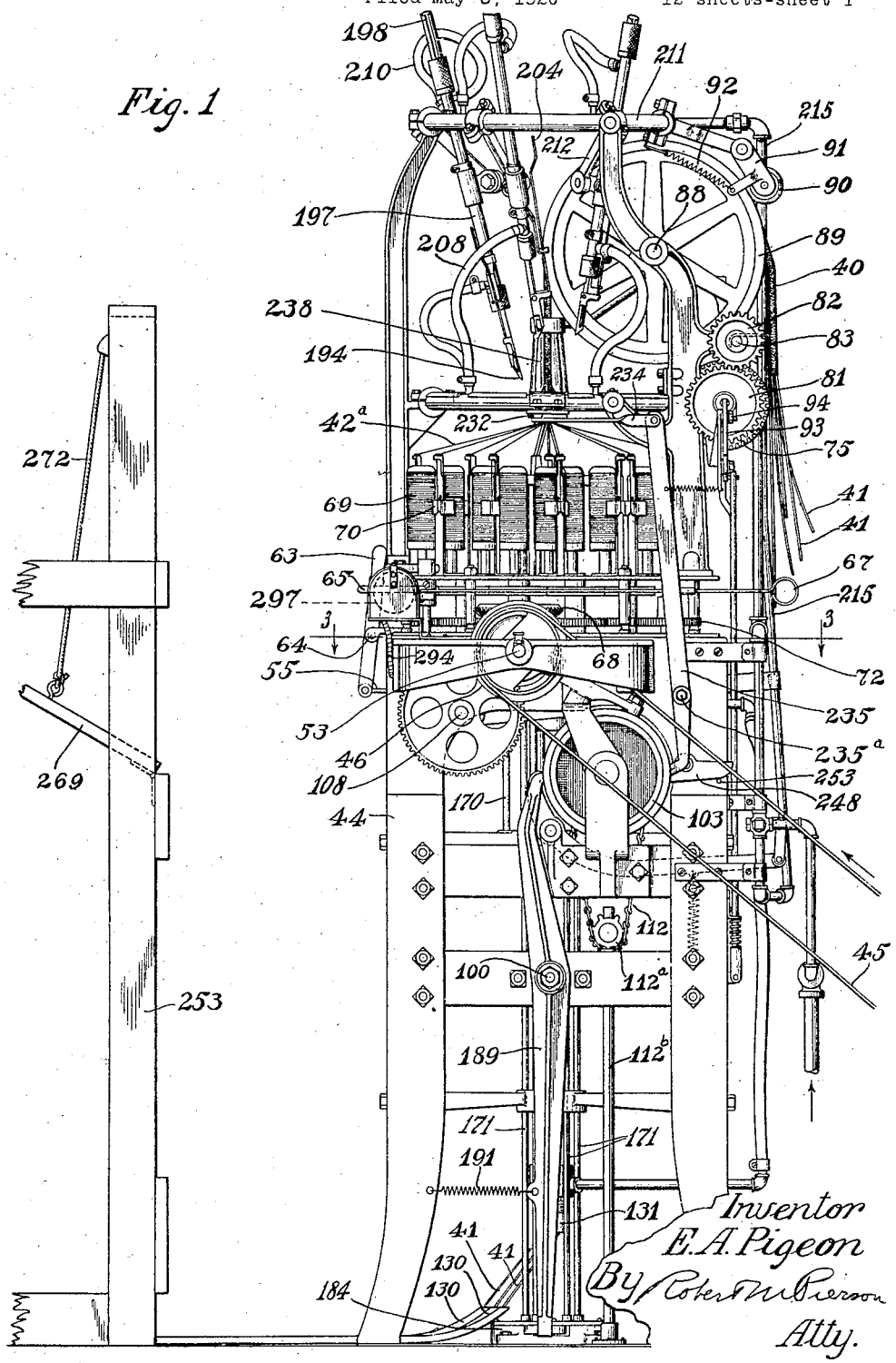
Fig. 1 is a side elevation showing an automatic wire-assembling machine constructed according to my invention, together with a portion of the wire-supplying apparatus therefor.

The principal instrumentalities embodied in the machine herein illustrated are as follows:

1. A braiding mechanism of the ordinary type for weaving a sheath of threads upon the bundle of wires.

2. A large feeder pulley, a presser wheel, and an automatically controlled pulley-actuating clutch in the upper part of the machine for pulling the work through the machine.

3. A group of pneumatic cylinders and pistons in the lower part of the machine and automatic gripping chucks in the pistons for seizing the individual wires and raising them to predetermined heights and to predetermined end positions for the commencement of the braiding operation, together with a group of wire-holding chucks at the lower ends of said cylinders for holding the wires in their raised positions until the braiding commences.

4. A group of cutters positioned above said cylinders and oscillated horizontally from a point below the cylinders for severing the lengths of wire which have been drawn up out of the cylinders.

5. A group of hooks, pneumatic cylinders and pistons in the upper part of the machine for reaching down at the completion of the main braiding operation on a covered unit, grasping the downwardly projecting loose ends of the individual wires and drawing them up in spread fashion above the braiding point, so that the machine may continue to braid on the core strand to form the cover of the connection between the just-completed unit and the one next to be formed.

6. A group of wire guides normally positioned above the braiding point but adapted to be depressed at the time when the wires are being raised by the lower group of pneumatic cylinders in order properly to guide the upper ends of the wires past the braiding point.

7. A pair of gathering jaws located at the braiding point which open up to permit the descent of said guides when the wires are being raised by the pneumatic cylinders and which close and gather closely together the wires at the braiding point when said guides have been raised out of the way.

8. A drum located just below the braiding mechanism and having a series of cam member for controlling the several operating instrumentalities, and a pawl for rotating said drum step by step.

9. A chain and a ratchet-and-pawl chain-feeder for controlling the rotation of said cam drum.

10. Means for supplying the individual wires and the core strand to the wire assembling machine, including a grooved drum for frictionally drawing the individual wires from their reels, a series of weighted arms and pulleys for applying tension to the wires leaving said drum, two series of electric switches actuated respectively in the upper and the lower positions of the individual arms for causing the shipper lever on the assembling machine to be tripped in order to stop said machine when a wire runs out or when a wire kinks, or when a kink or knot is encountered in the core strand.

These instrumentalities co-operate for the purpose of automatically feeding the individual wires to the desired lengths and end positions, applying a covering to the bundle of wires, and cutting off the indivdual wires in each unit at their lower ends, these operations being successively repeated on a connected series of units so that the operation is continuous as long as the materials are properly fed into the machine. It will be understood that the invention is not restricted to the use of the entire number of instrumentalities above listed for performing these functions and also that the particular character of the several devices which are employed may be widely varied without departing from the essential nature of my invention.

Figure 30:
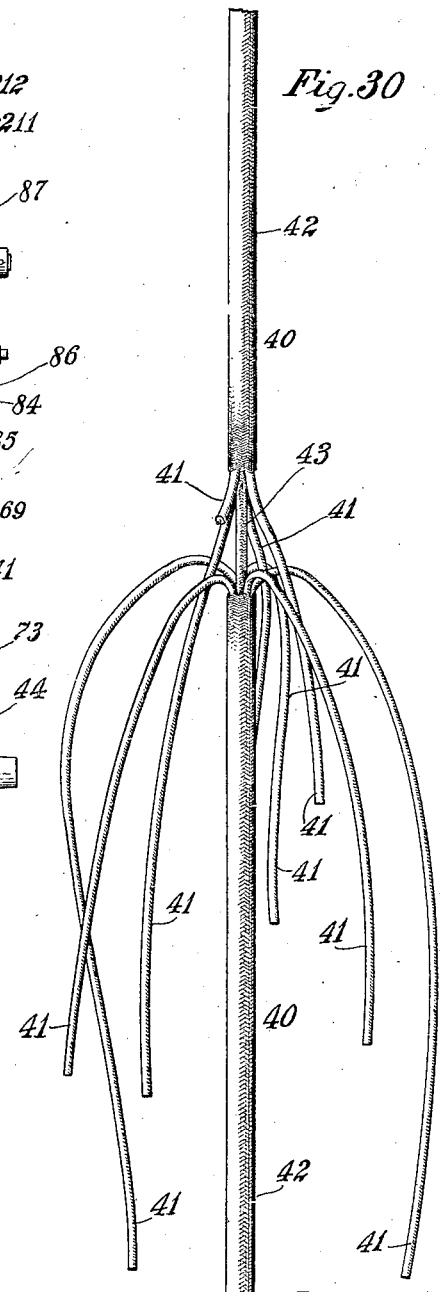
Fig. 30 (Sheet 2) is an elevation of the work showing the adjacent end portions of two connected braided units.

In Fig. 30 of the drawings, and to some extent in other views, I have represented the type of work produced by the machine, 40, 40 being the adjacent end portions of two connected units each comprising a bundle of individual insulated wires 41, 41, five in number in this instance (the upper wire at the extreme left in Fig. 30 being broken off for the sake of clearness), and a thread sheath 42 braided upon the bundle of wires except at their ends, together with a connector 43 between the adjacent units which is adapted to be cut in two when the units are separated, this connector comprising the central twine core with a braided covering or sheath thereon.

*Driving mechanism and braider.*

44 is a frame carrying the several parts of the assembling machine. Power is brought to the machine by a belt 45 running over a pulley 46, which turns loosely on a fixed hollow shaft 47 (Fig. 4), upon which the pulley has a limited axial clutching and de-clutching movement. Also loosely mounted on said fixed shaft is a pinion-sleeve 48 formed with a spur driving-gear-pinion 49, and having splined to its right-hand portion a grooved axially-slidable clutch-collar 50, the left-hand end of said sleeve occupying a counter-bore in the hub of the pulley 46. A spring 51, also occupying said counter-bore, is interposed between the sleeve and the end wall of the pulley hub and tends to force the pulley outwardly into a de-clutching position. The outer end of the pulley hub is abutted by the inner one of a pair of thrust-collars 52, the outer one of which abuts against a shoulder on an axially-slidable rock-shaft 53, the main portion of the latter being suitably grooved and drilled and the fixed shaft 47 being correspondingly drilled for lubrication. The adjacent faces of the pulley 46 and gear-pinion 49 carry suitable positive clutch members 54, which are brought together by the rocking and inward axial movement of the shaft 53 through the drag of a shipper-link 55 on an arm 56 depending from the inner end of the rock-shaft, said arm and the machine frame having co-operating cam members 57, 58 to produce the axial movement when the arm is rocked, and the hub of the arm having a stop projection 59 which abuts against the under side of a ledge 60 on the frame to limit the retracting movement of the rock-shaft (see Figs. 1, 3, 4 and 5). Also mounted to turn loosely on the fixed shaft 47 is a bevel gear 61 adapted to be driven from the pulley 46 through the sleeve 48 and splined collar 50 when the clutch members 54 are engaged and when certain other positive clutch members 62 on the adjacent faces of collar 50 and bevel-gear 61 are brought into engagement by an inward movement of the collar.

The outer end of link 55 is pivoted to the lower end of a shipper handle or lever 63, fulcrumed on the frame at 64 and adapted to be held in running position by a latch-lever 65, which is pivoted at 66 (Fig. 7) to swing horizontally, and has one arm connected with a pull-rod 67, running to the rear of the machine for manually tripping the latch to stop the machine, spring 51 (Fig. 4) acting to throw out the clutch 54 when the shipper-lever is released. The latch-lever 65 is also controlled electro-magnetically in a manner hereinafter described.

Bevel gear 61 meshes with another bevel gear 68 (Figs. 1 and 2) mounted near the lower end of one of the vertical shafts of the braider, which is designated generally by the numeral 69. This braider is composed of the usual double series of spindles carrying thread-spools actuated by a train of gears 73 and guided circularly in intersecting sinuous paths in order to weave a tubular sheath, and it includes the usual drop-weights 70 which fall into the path of a part connected with the shipper latch-lever 65 in order automatically to stop the machine when a thread breaks. As this part of the mechanism is of familiar type, it is not here illustrated in full detail.

Automatic control of the operation of the braider is effected by axial shifting of the clutch-collar 50 by means of a lever 120 fulcrumed at 120ª. The forked end of this lever has suitable studs 121 occupying a groove 122 in the collar 50 and its other end has a stud 123 occupying a groove 124 in a cam 125 formed on the outer end of a cam-drum 103. The groove of this cam is formed with long and short braiding portions 126, 127 and two short non-braiding portions 128, 129.

A vertical shaft 71 (Figs. 8 and 9) carrying at its lower end a gear 72 in mesh with the horizontal gear train 73 of the braider is provided at its upper end with a worm 74 meshing with a worm-gear 75 (Figs. 1 2, 8 and 9) attached to a driving friction-clutch plate 76. 77 is a complemental driven clutch plate fixed to a shaft 78 which is adapted to slide and rotate in a bearing 79 and is yieldingly moved into clutching position by a spring 80. To this shaft is attached a gear 81 which meshes with another gear 82 mounted on a shaft 83, the last-said shaft carrying a ratchet-wheel 84 (Fig. 2) engaged by a check-pawl 85 to prevent reverse rotation of said shaft when the clutch 76, 77 is released, and also carrying a gear-pinion 86 which meshes with a gear 87 on the shaft 88 of a large grooved pulley 89 for drawing the work upwardly through the braider. An idle presser-wheel 90, mounted on a pivoted bracket 91 and yieldingly drawn toward said pulley by a spring 92, holds the work tightly in the groove of the pulley, but may be lifted away to permit the insertion of the leading end of the work between said pulley and the presser-wheel when the first unit of a series is being drawn through.

For automatically controlling the drive of the work-feeding pulley 89, there is provided a small lever 93 pivoted at 94 and having its upper arm engaging the outer end of the clutch shaft 78, the lower arm of said lever being engaged by the short arm of an angle-lever 95 pivoted at 96, the longer arm of the last-said lever being pivoted to a vertical rod 97 which is yieldingly depressed to a clutch-engaging position by a spring 98. The lower end of said rod is pivotally connected with one arm of an angle-lever 99 fulcrumed at 100 and having an upwardly-extending arm whose extremity is formed for co-action with a pair of lugs 101, 102 on the cam-drum 103, the action of said lugs on lever 99 serving to disengage the clutch members 76, 77 and stop the feed of the work through the braider.

Cam drum and drive.

Drum 103 turns loosely on a fixed shaft 104 and its surface is provided with the several cam devices for automatically controlling the various operations of the machine. The inner end of this drum is provided with ratchet-wheel 105 (Figs. 3 and 6) adapted to be rotated one tooth at a time by a pawl 106, which is reciprocated by an eccentric 107 mounted on a shaft 108, a check-pawl 109 being provided to prevent reverse rotation of the ratchet-wheel and drum. To the outer end of shaft 108 is affixed a gear 110 meshing with the gear-pinion 49.

Since the drum 103 controls the actuation of the braider as well as of the other instrumentalities, and this actuation continues during a relatively-long part of the cycle of operations, it is desirable, in order to avoid using a drum of excessively-large diameter, that said drum should remain inactive during most of the time while the braider is forming the tubular covering on the wires. Accordingly, I omit one tooth from the ratchet-wheel 105, as indicated at 111 in Fig. 6, so that when this gap comes under the toe of the pawl 106, the drum will stop although the pawl continues to reciprocate, and I further provide a chain 112 having a pin 113 on one of its links, adapted to come up under a lug 114 on the face of the ratchet-wheel 105 to carry the missing-tooth gap 111 out from under pawl 106 and start the drum again in rotation, the length of said chain determining the length of the period during which the braider remains in operation. Chain 112 is carried by a sprocket 115 which turns loosely on the shaft 104 and which has affixed to its hub a ratchet-wheel 116, having a full number of teeth. This ratchet-wheel is engaged by a pawl 117 reciprocated by an eccentric 118 on a shaft 108 and its reverse rotation is prevented by a check-pawl 119. The lower end of the chain 112 runs around an idle sprocket 112ª, adjustably fixed on a vertical supporting rod 112ᵇ.

Wire elevating and holding devices.

The individual insulated wires 41 come to the machine horizontally along the floor through a series of conduits 130, shown in Fig. 1, and are turned upwardly and passed through a series of automatic one-way chucks 131 (Figs. 1, 2, 14 and 15), whose function it is to permit the free upward movement of the wires when propelled by the feeders and thereafter prevent them from falling back. Each chuck comprises an internally-conical casing 132, an adjustable stop-sleeve 133 screwed into the upper end thereof, and a series of externally-conical, internally-toothed segmental chuck jaws 134 similar to the ones shown in Figs. 17 and 18. The chucks 131 are supported on the lower ends of a series of threaded tubes 135, which screw into an air header 136 and are provided with check-nuts 137 for holding them fast on said header. These tubes constitute guides for the entering wires and their lengths and upper end positions are such as to impart the desired lengths of feed to the individual wires. On their upper ends are screwed a series of piston stops 138, provided with longitudinal cylinder-engaging ribs 139 forming air passages to the pistons around said stops, and they are also provided with packings 140 surrounding the wires 41. By screwing any tube 135 up or down in the header 136, the position of the corresponding piston stop 138 may be varied in order to adjust the length of feed of the wire.

141, 141 are a series of air cylinders having their lower ends fitted into the lower air header 136 and their upper ends fitted into a similar upper air header 142. In each cylinder is mounted a free piston 143, provided with a one-way automatic wire-gripping chuck constituted by an internal conical bore in the piston and a series of externally-conical, internally-toothed segmental jaws 144 (Figs. 15, 17 and 18). On the up-stroke of the piston these jaws grip and propel the wire, and on the down-stroke they automatically free themselves by reason of their own weight or by being pushed downward by a sleeve 145 screwed in the upper end of the piston.

The up-strokes of the pistons 143 are limited by a series of stop members 146, similar to the members 138, and provided with longitudinal cylinder-abutting ribs 147 to form air passages around said members. The stop members 146 are mounted on the lower ends of a series of wire guiding tubes 148, which screw into the upper air header 142 and extend above the latter to different heights corresponding to the positions of the several wire-cutting devices hereinafter mentioned, these tubes being provided with check nuts 149 and adapted to be adjusted up or down to correspond with any shifting of the vertical positions of said cutters.

150 is a twine core around which the bundle of wires is assembled, and 151 is a guide tube for said core arranged centrally of the group of air cylinders and provided with nuts 152 at its ends abutting against the air headers 136 and 142, said tube and nuts acting as a bolt which ties together the cylinders and headers.

The two air headers 136, 142 are formed with annular trunk passages 153, 154, connected respectively by pipes 155, 156 with the lower and upper branches of a valve casing 157 containing a double-ported plug valve 158. This valve has an external crank arm 159 with a throw of about 90° and is adapted to connect the lower branch pipe 155 with a compressed air supply pipe 160, leading into the valve casing, while the upper branch pipe 156 is connected with an exhaust opening 161 in said casing, and vice versa. In the intermediate position of said valve, the supply and exhaust openings are blanked.

The valve arm 159 is connected by a link 162 with the long arm of a lever 163 adapted to be yieldingly depressed by a spring 164, said lever being fulcrumed at 165 and having its short arm formed for engagement with a short high-lug 166 and two low-lugs 167, 168 abutting and circumferentially in line with said high-lug on the cam drum 103, the remote ends of said low-lugs being separated by a short gap 169. The action of the low-lugs 167, 168 upon the toe of the lever 163 causes the air-control valve 158 to be held in its intermediate port-blanking position. The action of the high-lug 166 causes the lower ends of the cylinders 141 to be supplied with compressed air and their upper ends to be exhausted as seen in Fig. 14, and the action of the gap 169 causes the lever to move into its broken-line position shown in this view, thereby reversing the valve and supplying compressed air to the upper ends of the cylinders while their lower ends are exhausted.

*Wire cutting devices.*

Figure 2:
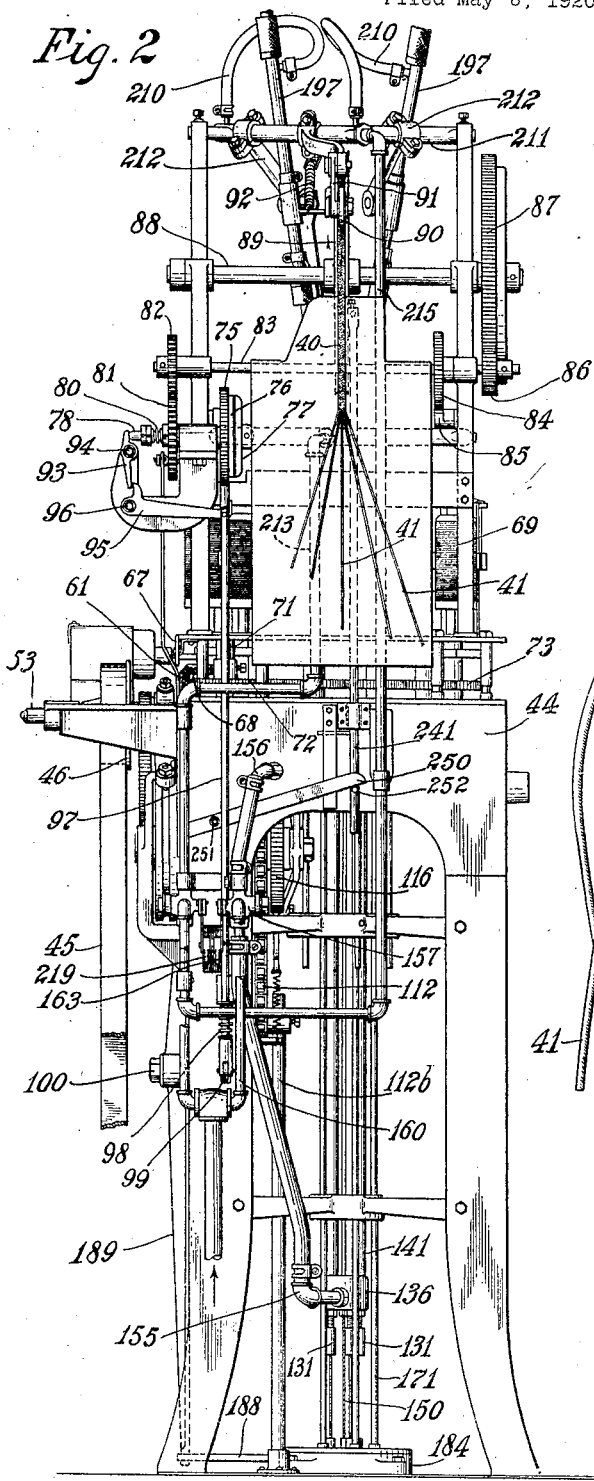
Fig. 2 is a rear elevation of the machine.

The wire cutters and their operating mechanism are shown mainly in Figs. 23 to 26, and also to some extent in the general views, Figs. 1 and 2, and in Figs. 3, 10 and 14. 170, 170 are vertical supporting rods fixed at their lower ends in a frame plate 170ª, and 171, 171 are vertical rock-shafts. A rod 170 and rock-shaft 171 for each cutting unit passes through the base-plate 172 of said unit, which is adapted to be fixed by means of set-screws 173 at different heights on the rod 170, corresponding to the point at which it is desired to sever each individual wire to obtain the necessary length of said wire in the braided unit. The plate 172 acts as a fixed shearing blade with a cutting edge 174 (Fig. 25) at the upper end of a conical hole 175 through which the wire passes from the guide tube 148. 176 is a movable shearing blade mounted to oscillate on a pivot 177, and having a cutting edge 178 at the lower end of a conical hole 179 which is adapted to be moved into line with the hole 175 by the action of a spring 180, blade 176 being arrested in its hole-aligning position by a stop 181. The holes are moved out of alignment and a wire cutting movement positively imparted to the oscillating blade 176 by means of an arm 182 adjustably secured by set-screws 183 to the shaft 171.

The lower ends of the vertical rock-shafts 171 are stepped in the base plate of a gear box 184, provided with a cover plate 185, and in said box is mounted to oscillate an internal gear 186, whose teeth mesh with those of a series of gear pinions 187, affixed to the lower ends of the rock-shafts 171. The oscillation of the gear 186 in a counter-clockwise direction rotates all of the shafts 171 and their arms 182 in the same direction so as to impart a cutting movement simultaneously to all of the blades 176, and when the gear is turned in the opposite direction the springs 180 return all of said blades against their stops 181.

Gear 186 has an arm 188 projecting through a slot 189 in the side of the gear box, and the forked end of said arm is engaged by the lower arm of an upright lever 189 fulcrumed at 100. The extremity of the upper arm of said lever is formed for engagement by a lug 190 on the cam drum 103, and said lever is yieldingly urged in the drum-engaging, cutter-retracting direction by a spring 191.

The upper ends of the rods 170 and rock-shafts 171 are respectively supported and have their bearings in a fixed plate 192 (Figs. 10, 13, 27 and 28), which is located just below the braiding point, and on this plate are also supported a series of tubes 193 of different lengths whose lower ends terminate just above the several wire cutters for guiding the wires in their passage from the cutters to the braiding point.

*Connector braiding auxiliaries.*

When the braiding of the main sheath 42 on the bundle of wires is completed, the sheath on the connector 43 is next braided, and in order to permit this the lower ends of the wires in the braided unit have to be drawn out above the shed of threads 42ª leading from the braider spools. To perform this operation, I provide a series of hooks 194 shown in the general views, Figs. 1 and 2, and also in Figs. 27, 28 and 29, mounted on upright rods 195 whose axes converge just below the braiding point, said rods being attached to pistons 196 mounted in air cylinders 197. Co-axial with these cylinders at their upper ends are mounted tubular guides 198 each formed with a longitudinal slot 199 on its side, occupied by a block 200 secured to the rod extension which passes through the upper end of the cylinder, in order to keep the hook 194 from turning. Each hook is provided with a latch or guard 201 pivoted to its shank at 202 and formed with a pointed lower end which enters a notch 203 in the hook when the latch is closed, the latch being operated through the longitudinal traverse of the hook by means of a rod 204 secured to the heel of the latch and passing through a hole in a bracket 205 secured to the air cylinder. Said rod has a cam off-set 206 near its upper end which co-operates with the edges of the hole in the bracket 205 in order to swing the latch open as the hook nears the lower end of its down-stroke, and close it again as said hook begins its up-stroke. The hooks 194 in descending through the shed of braiding threads as shown in Fig. 27 will take hold of the loose ends of the wires at the lower end of the braided unit, and on rising again will draw said loose ends outwardly between and above the threads as shown in Fig. 28, there being provided an annular metal platform 207 on which the hanging wire ends may rest. The latches 201 which are closed when the hooks are drawn up past the threads, serve the purpose of preventing said threads from catching in the hooks.

The lower ends of the cylinders 197 are connected through branch pipes 208 with an annular trunk pipe 209 which supports the platform 207, and their upper ends are similarly connected through branch pipes 210 with a second annular trunk pipe 211 from which the cylinders are adjustably supported by brackets 212. 213 is a pipe connecting the annular pipe 209 with the upper branch of the casing of a four-way valve 214, similar to the one shown in Fig. 14, and 215 is a pipe connecting the annular pipe 211 with the lower branch of said valve casing. 216 is a compressed air supply pipe leading into the valve casing and 217 is an exhaust branch leading therefrom. An arm 218 on the stem of the valve plug connects through a link 219 with the long arm of a lever 220, which is fulcrumed at 165 and has the extremity of its short arm formed for engagement with a relatively long low-lug 221 on the cam drum 103, and a relatively short high-lug 222 in line therewith, the adjacent ends of said lugs being separated by a gap 223. Lever 220 is held in contact with the cam drawn by a spring 224. The high-lug turns the arm of the plug valve to the position shown in Fig. 27 in order to supply compressed air to the upper ends of the cylinders 197 and depress their pistons and hooks, while the lower ends of said cylinders are exhausted; the gap 223 reverses the position of the valve so as to admit the air to the lower ends of the cylinders and exhaust their upper ends, thereby elevating the hooks, and the low-lug 221 to retain the hooks in their elevated positions.

To bunch the group of wires closely together at the braiding point, I employ a pair of gathering jaws 225, 226 shown mainly in Figs. 19 to 22 and pivoted at 227, 228 on the under side of a bracket 229 which is clamped upon the annular air pipe 209. The acting ends of these jaws are drawn apart by a spring 230 and are positively forced together by the action of a cam 231, which is formed on a lever arm extension 232 of the jaw 225 near the fulcrum of the latter, upon a complemental cam 233, formed upon the jaw 226 near its fulcrum. The arm 232 connects by a link 234 with the long arm of an upright lever 235, fulcrumed at 235ª, whose short arm is formed for engagement with a lug 236 on the cam drum 103 and is yieldingly held against said drum by a spring 237, the action of the lug serving to move the gathering jaws 225, 226 to their closed position as indicated in Figs. 21 and 22, while the spring 237 returns them to their open position represented in Figs. 19 and 20 when the toe of the lever 235 runs off the lug 236.

To guide the upper ends of the wires 41 past the braiding point at the time when they are being fed upwardly by the lower air pistons, I provide a number of guides 238, shown mainly in Figs. 10 to 13, affixed by their upper ends in a circular group to a ring 239. These guides are longitudinally split or open on their inner sides. Said ring is mounted at the end of an arm 240 secured to the upper end of a rod 241 mounted to slide vertically in guides 242 on the machine frame and yieldingly elevated by a spring 243, said rod having a pin 244 (Fig. 11) near its lower end which slides in back of a guide strap 245 and is adapted to abut against a stop 246 to limit the upward travel of the rod. For depressing the rod 241 and the guides 238 carried thereby, the cam drum 103 is provided with a lug 247 for engaging the short arm of a lever 248 fulcrumed on the frame at 249, the long arm of this lever engaging the short arm of a connecting lever fulcrumed at 251. The long arm of lever 250 works against a pin 252 on the lower end of the rod 241. A pin 253 under the lever 248 acts as a stop to limit the return throw of said lever. The top position of the guides 238 carries them upwardly past the gathering jaws 225, 226 and in their bottom position their lower ends over-lap upon the fixed wire guides 193.

*Wire supplying mechanism and stop motion.*

For the purpose of supplying the wires to the assembling and covering mechanism and relieving the pistons 143 and the work-feeder therein of a part of the duty of unwinding the wires from their spools and drawing them into said mechanism, and in order also automatically to stop the assembling machine when a wire runs out or when there is encountered a kink or other protuberance on any of the wires or on the central twine core, which might obstruct the passage thereof into or through the assembling machine, I provide the apparatus shown in Figs. 31 to 34, and also to some extent in Figs. 1, 3, 5 and 7. 253 is a frame set near the assembling and braiding machine and carrying on certain of its members hooked supporting brackets 254 for the journal rods 255 of a series of wire-supplying spools 256, and also carrying a suitable holder for a twine cop 257. From the spools 256 the wires 41 run to a row of idle-running grooved guide-pulleys 258, either directly or over suitable auxiliary guides, and from there onto a drum 259 whose periphery is formed with a number of parallel grooves to receive the wires and whose shaft 260 is mounted in bearings 261 and provided with a belt pulley 262 (omitted in Fig. 31), for connection with a source of power to positively rotate the drum 259. After passing around nearly the entire circumference of the drum, the wires are led off around a series of idly-mounted grooved pulleys 263, over guide bars 264, 265, and under a guide roller 266 which is driven by a belt 267 from the drum 259. From the roller 266 they spread outwardly and upwardly and are led over a series of grooved idle rollers 268, loosely journaled on the ends of a series of tension arms 269 hinged to the frame at 270. The weight of the arms and rollers is slightly overbalanced by a series of weights 271 connecting with the arms by means of cords 272 running over pulleys 273. To the lower sides of the arms 269 are secured a series of feeler brackets 274 having eyes 275 through which wires 41 pass, these eyes being of such size that a kink 41ª (Fig. 33), or other form of abnormal projection on the wire, will catch on the feeler bracket and tend to depress the arm 269 to its lowest position. From the feeler brackets 274, the wires lead downwardly over a guide bar 276 and under a roller 277, and from there horizontally along the floor through the ducts 130, shown in Fig. 1, to the assembling machine.

The twine core strand 150 leads from the cop 257 through guiding eyes 279, 280, and then horizontally in a sinuous path between the staggered studs 281 of a frictional tension device 282 and through a conduit 130ª to the center of the group of wires in the assembling machine.

On an upper cross-bar 283 of the frame 253 are arranged a series of push-button switches 284, each adapted to be closed by a corresponding tension arm 269 in the uppermost position of said arm in case its wire should run out, and on the lower cross-bar 285 are arranged a similar series of push-button switches 286, each adapted to be closed in the lowermost position of its arm in case said arm should be drawn down into that position by a kink in the wire. 287 is a feeler hinged to the frame at 288 and provided with an eye 289 through which the twine core strand 150 passes, and 290 is a push-button switch adapted to be closed by said feeler when the latter is swung against it by a knot or similar obstruction on the core strand. The several switches 284 and 286 and the switch 290 are located in individual branch circuits 291, 292 and 293 which are connected in multiple with a trunk circuit 294, and in said trunk circuit are located in series a battery or other source of current 295, a push-button switch 296 (Figs. 3 and 31) and a solenoid 297 (Figs. 1, 7 and 31). On the armature core 298 (Fig. 7) of this solenoid is mounted a rod 299, having a slot 300 in its end occupied by a pin 301 on the shipper latch-lever 65, and when said armature core is drawn into the solenoid by magnetic attraction, the latch lever is tripped and the shipper-handle 63 released, thereby allowing the spring 51 (Fig. 4) to separate the clutch members 54 and stop the operation of the braiding and assembling machine. This occurs when any one of the switches 284, 286 or 290 is closed by an abnormal condition in a wire or in the twine core strand. At the same time, the solenoid circuit is opened at the switch 296 by the recession of a block 302 (Figs. 3 and 5) attached to the link 55, which has held said switch closed while the shipper-handle 63 was in its running position, the effect of thus opening said circuit being to prevent the waste of current and heating of parts in the solenoid circuit when the stopping has been accomplished.

*Operation.*

Referring at first to the wire-supplying and electrical stop motion device, and assuming that the wire assembling machine has been placed in operation by an attendant at the left of the machine manipulating the shipper handle 63 to engage it with the latch 65, the exertion of draft upon the wires by the elevation of the wire-feeding pistons 143 or by the subsequent action of the work-feeding pulley 89 will cause said wires to grip the bottoms of the grooves in which they run on the positively-rotated drum 259, and thereby to be frictionally propelled by said drum as long as the draft or "call" on the wires continues. The air pistons and the work feeder are thus partially relieved of the duty of furnishing the power for unwinding the wires from their spools and for overcoming friction along their paths. The pull exerted by the pneumatic wire feeders and the work feeder, and the tension on said wires when held from receding by the automatic holding devices 131, is such as normally to maintain the tension arms 269 in a range of positions intermediate between the two sets of switches 284, 286. If a wire should run out, the resulting loss of tension upon the pulley 268 of the corresponding arm 269 would allow its weight 271 to draw the arm upwardly and close the corresponding switch 284. If a kink, knot or other obstruction in any one of the wires 41 or in the twine core strand 150 should encounter the corresponding feeler bracket 274 or the feeler 287, the resulting extra tension on the corresponding arm 269 or on the last-said feeler will cause the corresponding switch 286 or the switch 290 to be closed. In either of these three cases, the circuit of the solenoid 297 will be completed and the shipper handle 63 automatically released, thus stopping the operation of the assembling machine and allowing the obstruction to be removed before it causes any jamming in the air cylinders or their immediate approaches, or obstruction or breakage of the twine core.

In the following operation of the braiding and assembling machine, it may be assumed that a braided unit 40 has been completed and its intermediate portion is on the feed pulley 89, as shown in Figs. 1 and 2, and that the tie sheath is being braided upon the twine core strand at the connector 43 between that unit and the next succeeding one. The toe of lever 99 (Fig. 8) is in the gap between the lugs 101, 102 on the cam drum 103, and the friction clutch members 76, 77 for driving the feed pulley 89 are engaged. Stud 123 on the forked lever 120 is in the short dwell 127 of the groove in the cam 125 on said drum, and the splined collar 50 is drawn inwardly so that the braider 69 is being driven from the pulley 46 through the clutches 54 and 62 by way of the bevel gear 61. The toe of lever 235 (Fig. 19) is in the gap between the ends of the lug 236 on the cam drum, and the gathering jaws 225, 226 are spread open as shown in Fig. 20. The guides 238 (Fig. 10) are raised above said jaws, but the lug 247 on the cam drum is approaching the toe of the lever 248. The toe of lever 220 (Fig. 27) is in the gap 223 on the cam drum, and the hooks 194 are elevated to lift the lower ends of the wires in the braided unit above the shed. The toe of lever 163 (Fig. 14) is on the low-lug 167 of the cam drum, which holds the four-way valve 158 in its port-blanking position, the pistons 143 being then in their lowest positions in the cylinder 141. Lug 190 (Fig. 23) on the cam drum has passed from under the toe of lever 189, thus leaving the fixed and pivoted cutter plates 172, 176 with their wire-receiving apertures aligned. The cam drum 103 is being rotated step by step by the action of pawl 106 on the ratchet wheel 105. The ratchet wheel 116 is also being rotated by its pawl 117 and the chain 112 propelled step by step, which latter action is continuous.

The sequence of operations is thereafter as set forth in the following schedule.

1. Stop feeding the work. This is done by action of the cam lug 102 (Fig. 8) which causes the clutch 76, 77 to be released and the pulley 89 to cease rotating.

2. Stop braiding. This occurs at about the same time that the work feed ceases, and is caused by the action of the off-set 129 in the groove of cam 125 (Fig. 3) in retracting the splined collar 50 to disengage the clutch 62 (Fig. 4).

3. Depress the guides 238. The action of the cam lug 247 (Fig. 10) upon the toe of the lever 248 produces this action and causes the pointed lower ends of said guides to descend between and spread apart the threads 42$^a$ in the braiding shed until said lower ends over-lap the fixed wire guides 193, as shown in Figs. 10 and 13.

4. Elevate wires. Lug 166 (Fig. 14), coming under the toe of the lever 163, causes compressed air to be admitted to the lower ends of the cylinders 141, thus forcing up their pistons to the upper ends of their strokes, as shown in Fig. 15. The wires which had previously been cut off by the shearing devices 172, 182 at the several heights necessary to give the desired positions to the lower ends of the wires in the braided unit are thereby elevated through a height determined in the case of each individual wire by the distance between the lower and upper piston stops 138, 146, and said wire is given the length and upper end position which it is desired that it shall have in the unit about to be braided. The wires are thus fed past the braiding point and their upper ends over-lap upon and project above the lower ends of the wires in the previous unit, as shown in Fig. 10.

5. Raise guides 238. This is accomplished by the action of the spring 243 (Fig. 10) when the toe of lever 248 runs off the lug 247.

6. Close gathering jaws 225, 226. The braiding point is located immediately above the outlets of the fixed wire guides 193, which are spaced in a rather wide circle in order to facilitate the above-described elevating operation at the advance ends of the wires, and accordingly it is desirable, when braiding the main cover 42, to bunch the wires closely together at the braiding point by the action of the gathering jaws, as indicated in Fig. 22, the closure of said jaws being effected by the long-lug 236 (Fig. 19) on the cam drum coming under the toe of the lever 235.

7. Start braiding. At about the same time that the gathering jaws are closed upon the work, the running of the stud 123 (Fig. 3) into the long dwell 126 from the off-set 129 in the groove of the cam 125 shifts the splined collar 50 to engage the clutch 62, and start the braider in operation. This resumption of braiding at the transition between the connector sheath and the main cover on the next succeeding unit is established over a brief period without any accompanying feed of the work in order that a tighter or closer braiding may be performed at this point for the sake of extra strength in the cover where the loose ends of the wires issue therefrom. The work feed is suspended at this point by the action of the lug 102 in opening the clutch 76, 77 (Figs. 2, 8 and 9) through the lever 99 and intermediate connections.

8. Restore work feed. The passing of lug 102 from under the toe of lever 99 (Fig. 8) closes the clutch 76, 77, and the feeding of the work begins and continues until a cover 42 of the desired length has been braided thereon, the preceding unit and the connector serving as a flexible tractor member whereby the motion of the periphery of the feed pulley 89 is communicated to the unit which is coming through the braider, until the advance end of the last-said unit comes under the presser roll 90, whereupon it acts as its own tractor. Preferably at about the same time as this resumption of feed of the work to start braiding the main cover thereon the missing-tooth gap 111 (Fig. 6) in the ratchet wheel 105 attached to the end of the cam drum comes under the point of pawl 106, and the rotation of said drum ceases until the pin 113 on the chain 112 engages the lug 114 on said ratchet wheel and moves it ahead to allow the pawl 106 again to function, thus permitting the braiding of the main cover to a length determined by that of the chain and also permitting such length to be varied by a substitution of chains or addition or subtraction of links without requiring a cam drum of excessively large diameter and without requiring any changing of the cam drum or its parts. The cam drum, again in motion, can now control the remaining operations of the cycle.

9. Retract wire feeding pistons 143. This is done by the toe of lever 163 (Fig. 14) running into the gap 169 between the lugs 167, 168 on the cam drum and causing the four-way valve 158 to be reversed from its position shown in this view in order to exhaust the lower ends of the cylinders 141 and admit compressed air to their upper ends to force down such of the pistons 143 as have not already dropped against their lower stops by reason of leakage of the trapped air pressure underneath them and the action of gravity upon the said pistons. While these latter factors might be solely relied upon to return the pistons, especially if the latter were provided with sufficient weight or other constant retracting force, I prefer to employ the more positive action of compressed air above the pistons. The upper admission is only momentary and the plug valve is then restored to neutral position by the cam lug 167.

10. Stop work feed. Cam lug 101 (Fig. 8), coming under the toe of lever 99, opens the work feed clutch.

11. Stop braiding. At about the same time the action of the cam groove off-set 128 upon the forked lever 120 (Fig. 3) shifts the splined collar 50 to open the braider driving clutch 62. The machine is now ready for performing the operations at the lower end of the braided unit.

12. Cut wires. The coming of cam lug 190 under the toe of lever 189 (Fig. 23) turns the internal gear ring 186 and simultaneously operates all five of the cutter-actuating arms 182 in order to shift the pivoted cutters 176 to the position shown in Figs. 24 and 25 and thereby sever the wires at such heights as will leave their protruding lower parts in the braided unit at the desired predetermined end positions. The pivoted cutters are immediately retracted by the action of the spring 191 when the cam lug runs past the toe of the lever, in order to restore the alignment of the wire-receiving apertures 175, 179.

13. Open the gathering jaws 225, 226. This is accomplished by the action of the springs 230 and 237 (Figs. 19 and 20) when the toe of lever 235 runs off the lug 236, in order to make way for the descent of the pull-out hooks.

14. Lower the pull-out hooks 194. The high cam lug 222, coming under the toe of lever 220 (Fig. 27) throws the arm of the four-way valve in casing 214 to its upper position, admitting compressed air to the upper ends of the cylinders 197, exhausting their lower ends and depressing their pistons 196, thereby carrying the hooks down through the braiding shed, as shown in this view, and engaging said hooks with the loose portions of the wires at the lower end of the braided unit, protruding from the guides 193 at points immediately above said guides.

The guard latches 201 on the hooks are opened up by the action of the cam off-sets 206 on the rods 204 in conjunction with the brackets 205 as said hooks pass below the braiding shed, and the latches are closed again at the beginning of the up-stroke of the hooks in order to prevent said hooks from catching on the threads.

15. Elevate pull-out hooks 194. The dropping of the toe of the lever 220 into the gap 223 (Fig. 27) reverses the four-way valve in the casing 214 in order to admit compressed air to the lower ends of the cylinders 197 and exhaust their upper ends, thereby elevating the pistons 196 and hooks 194, as shown in Fig. 28, and drawing the loose ends of the wires on the braided unit out between the threads in the braiding sheath and to a height above the braiding point. Restoration of the valve to its neutral position by the action of the low-lug 221 then traps the air in the lower ends of the cylinders, and this, together with the friction of the parts, causes the hooks to be left in or near their uppermost positions until it is time for them again to descend in the next succeeding cycle.

16. Start braiding connector sheath 43. This occurs by the action of the dwell 127 in the cam groove 124 (Fig. 3) in throwing the braider clutch 62 into operation, and the braiding at first takes place without any accompanying feed of the work, in order to form a closer mesh of increased strength in the sheath at the lower junction between the main covering portion 42 and the connector sheath.

17. Restore feed of work. This is done by the gap between the lugs 101, 102 (Fig. 8) coming under the toe of the lever 99 and causing the clutch 76, 77 to be closed, and the braiding and work feed continue until the desired length of connector sheath is formed, as determined by the cam drum. One complete unit of wires has now been assembled, cut, provided with a braided cover and a suitable tie at both ends of said cover, and the machine is ready for a new cycle of operations which begins without interruption in the performance.

The production of units continues in connected succession as long as materials are properly supplied to the machine, and the work as it issues from the machine is suitably disposed of, preferably by cutting each connector in two as a finished unit passes off from the feed pulley 89.

I believe the process of feeding, assembling, and covering connected units as performed by this machine, and the product of connected units made thereby, to be novel in addition to the novel features of construction and mode of operation of the apparatus itself. Great latitude of variation is obviously possible in carrying out the invention, and the latter is not wholly limited to the details of embodiment and performance herein described.

I claim:

1. In a wire-covering machine, the combination of means for automatically feeding a plurality of wires to a position for covering, means for automatically applying a covering around the group of wires, and means for automatically cutting off each wire at a predetermined distance from said covering.

2. In a wire-covering machine, the combination of means for automatically feeding a plurality of wires to a position for braiding, means for automatically braiding a sheath on the group of wires, and means for automatically cutting off the individual wires at different predetermined points.

3. In a wire-covering machine, the combination of means for automatically feeding a plurality of wires to several different end positions, means for automatically applying a covering around the intermediate portion of the group of wires, leaving their terminal portions exposed, and means for automatically cutting off said wires in predetermined lengths.

4. In a wire-covering machine, the combination of means for automatically feeding a wire, means for automatically applying a covering of predetermined length thereon, and means for automatically cutting off said wire.

5. In a wire-covering machine, the combination of means for automatically and intermittently feeding upwardly a series of wires, means for automatically braiding a sheath of predetermined length upon the group of wires, leaving their upper and lower terminal portions protruding from the sheath, and means for automatically cutting off said wires in predetermined lengths.

6. The method of making wire assemblies which comprises assembling successive groups of wires upon a core strand and applying binding and connecting elements to said successive groups and to said core strand to form a string of connected assemblies.

7. The method of making wire assemblies which comprises feeding a group of wires to predetermined end positions, braiding a sheath upon said group, severing the wires, and continuing the braiding operation free from said wires to form a connector, advancing the unsevered portions of said wires to predetermined end positions, and continuing the braiding operation to braid a sheath thereon.

8. The method of making wire assemblies which comprises assembling a group of wires about a continuous core strand, braiding a covering upon said group, cutting off the wires, and continuing the braiding upon a succeeding group of wires assembled about said core strand while using the first mentioned group and the core strand therein as a tractor for drawing said succeeding group through the braider.

9. The method of making wire assemblies which comprises intermittently feeding wires in successive groups whose adjacent ends overlap, intermittently feeding a core, braiding a covering upon the intermediate portions of the wires in the successive units and upon the unit-connecting portions of the core, cutting off the wires at the trailing end of each unit between the respective braiding operations upon such unit and upon the following unit-connecting portion of the core, and employing a completed unit as a tractor for feeding the next-succeeding unit through the braiding devices.

10. In a wire-covering machine, the combination of means for pushing a wire past a severing point, posterior means for pulling it past said point, means for severing the wire, and devices for co-ordinately operating said means in the following order: 1st, said pushing means, 2nd, said pulling means, and 3rd, said severing means.

11. In a wire-covering machine, the combination of means for applying a covering to a group of wires, means for drawing said group through said covering means, means for severing said wires, and a controller common to said instrumentalities for automatically timing their operation.

12. In a wire-covering machine the combination of means for assembling a group of wires, means for applying a covering thereto, means for severing said wires anterior to said cover applying means, and a controller common to said several means for timing their operation.

13. In a wire-covering machine, the combination of means for assembling a group of wires and braiding a covering thereon, a rotary device automatically controlling the functions of the machine, and mechanism for rotating said device, including means for automatically suspending and then restoring its action during the braiding period.

14. In a wire-covering machine, the combination of means for assembling a group of wires and applying a cover thereto, a rotary member for automatically controlling the functions of the machine, said rotary member being provided with an interrupted set of teeth, a member coacting with said teeth to turn said rotary member, and means for periodically turning said rotary member to bring the teeth of said set into engagement with said coacting member.

15. In a wire-covering machine, the combination of means for assembling a group of wires and braiding a covering thereon, means including a cam drum for automatically controlling the functions of the machine, said drum being provided with an incomplete set of ratchet teeth, a pawl adapted to coact with said ratchet teeth to drive said cam drum, and a chain provided with means for periodically advancing said cam drum and thereby bringing said ratchet teeth into position to be engaged by said pawl.

16. In a wire-covering machine, the combination of means for assembling a group of wires and applying a covering thereto, a rotary member for controlling the functions of the machine, a ratchet and pawl for driving said rotary member, means for rendering said pawl inoperative during a part of the covering period, and means for automatically restoring it to operation on the ratchet.

17. In a wire-covering machine, the combination of a braider and means for automatically feeding successive groups of wires into position to be covered by said braider.

18. In a wire-covering machine, the combination of a braider, and means for automatically cutting off and controlling the movements and positions of successive groups of wires so as to cause a continuous tubular sheath from said braider to form covers for successive groups and connectors between groups.

19. In a wire-covering machine, the combination of a source of supply for a group of continuous wires, means for intermittently feeding said wires to predetermined end positions, means for applying a cover to an intermediate part of said group of wires, and means for severing the wires of said group at predetermined distances from said cover, to produce a bundle of wires with loose ends.

20. In a wire-covering machine, the combination of means for automatically assembling a series of groups of wires, means for automatically braiding cover sheaths consecutively upon the successive groups and for automatically braiding connectors between the successive cover sheaths, a feeder for drawing the work through the braiding means, and means for automatically stopping and starting said feeder at predetermined points in the progress of the braiding.

21. In a wire-covering machine, the combination of a braider, means for feeding successive lengths of a plurality of wires and holding them in position to be covered in groups throughout a part of the length of said groups and connected by the braid from said braider, a feeder for drawing the work through the braider, and means for automatically stopping and starting said feeder at predetermined points in the progress of the braiding.

22. In a wire-covering machine, the combination of means for automatically feeding wires and cutting them predetermined lengths with the anterior end portions of a group of wires overlapping the posterior protruding end portions of the wires in the preceding braided unit, means for automatically braiding a cover sheath on the intermediate portion of each succeeding group of wires and for braiding a connector sheath between each pair of braided units, a work feeder and means for automatically suspending the operation of said feeder at the beginning and end of each connector sheath where the wires protrude from the body sheath in order to increase the closeness of the weave at these points, and for automatically restoring it to operation after each suspension.

23. In a wire-covering machine, the combination of means for automatically assembling wires in a series of groups and cutting them off, means for automatically braiding a cover sheath on each group and for automatically braiding connector sheaths between the groups, a feeding pulley for drawing the work through the braiding means, a co-operating presser wheel, a clutch for driving said pulley, and a cam controlling said clutch and adapted to time the operation thereof with the operation of the assembling and braiding means.

24. In a wire-covering machine, the combination of means for automatically feeding wires to predetermined lengths, means for automatically cutting them off, means for automatically braiding a sheath on each group of wires, a feeder for drawing the work through the braiding means, and cam devices for co-ordinating the action of the several said instrumentalities.

25. In a machine of the character described, the combination of a wire cutter, and means for intermittently feeding a wire to a predetermined length past said cutter, said means comprising a fluid-pressure cylinder through which the wire passes, a piston in said cylinder having an automatic wire-gripping chuck, and means for controlling the supply of fluid to and its exhaust from said cylinder.

26. In a machine of the character described, the combination of means for applying a covering to a wire, a cutter anterior thereto for severing said wire, and wire-advancing means anterior to said cutter for feeding the wire past said cutter.

27. In a machine of the character described, the combination of means for applying a covering to a wire, a cutter anterior thereto for severing said wire, wire-retaining means anterior to said cutter comprising a stationarily-mounted one-way wire-gripping chuck, and means for feeding the wire in successive movements of predetermined length through said chuck.

28. In a machine of the character described, the combination of means for applying a covering to a wire, a cutter anterior thereto for severing said wire, and wire-advancing means anterior to said cutter comprising a fluid-pressure cylinder through which the wire approaches said cutter, a piston in said cylinder having a one-way wire-gripping chuck, means for controlling the admission of pressure fluid to and its exhaust from said cylinder, and a one-way wire-gripping chuck stationarily mounted anterior to said cutter.

29. In a machine of the character described, the combination of means for applying a covering to a wire, a cutter anterior thereto for severing said wire, and wire-advancing means anterior to said cutter comprising a fluid-pressure cylinder through which the wire approaches said cutter, a free piston in said cylinder having a one-way wire-gripping chuck, and means controlling the admission of pressure fluid to and its exhaust from the two ends of said cylinder for causing the piston to be propelled alternately in opposite directions in said cylinder.

30. In a machine of the character described, the combination of means for applying a covering to a wire, means for severing the wire, and wire advancing means comprising a fluid-pressure cylinder through which the wire approaches said cutter, a piston in said cylinder having an automatic wire-gripping chuck, and a stop for said piston adjustable axially of the cylinder.

31. In a machine of the character described, the combination of means for applying a cover to a wire, a fluid-pressure cylinder through which the wire approaches said cover-applying means, a piston in said cylinder having an automatic wire-gripping chuck, a piston stop adjustable axially of the cylinder, and a wire cutter positioned between said cylinder and said cover-applying means and adjustable from and toward said cylinder.

32. In a machine of the character described, the combination of means for applying a cover to a strip of material, means for drawing the work past said cover-applying means, and work-advancing means positioned below the latter for feeding the strip thereto, the last-said means comprising an upright fluid-pressure cylinder having a piston provided with a chuck for elevating the strip to the cover-applying means, and a piston stop in said cylinder adjustable axially thereof.

33. In a machine of the character described, the combination of means for applying a covering to a wire, wire-advancing means comprising an upright fluid-pressure cylinder having a free piston provided with a one-way wire-gripping chuck, top and bottom stops for said piston adjustable axially of the cylinder, means for admitting pressure fluid to and exhausting it from the two ends of said cylinder, a wire cutter located above said cylinder for receiving the wire therefrom, and means for fixing said cutter at different heights.

34. In a wire-covering machine, the combination of a group of fluid-pressure cylinders having pistons provided with wire-gripping chucks, means for controlling the supply of pressure fluid to and its exhaust from said cylinders, a series of wire cutters located posterior to the respective cylinders, means located posterior to said wire cutters for applying a covering to the group of wires, and means for automatically co-ordinating the action of the several said instrumentalities.

35. In a wire-covering machine, the combination of a group of fluid-pressure cylinders having free pistons, some of whose strokes differ in length from that of other pistons in the cylinder group, for feeding wires to different predetermined end positions, means automatically controlling the admission of pressure fluid to and its exhaust from said cylinders, means for automatically applying a covering to the group of wires fed by the pistons, and means for cutting off the wires in predetermined lengths.

36. In a wire-covering machine, the combination of a group of upright fluid-pressure cylinders having wire-feeding pistons, some of whose up-strokes begin at different heights from those of others of the pistons, means automatically controlling the admission of pressure fluid to and its exhaust from said cylinders, a group of wire cutters located at various heights above the respective cylinders, means for automatically actuating said cutters, and means for automatically applying a covering to the group of wires fed by the pistons.

37. In a wire-covering machine, the combination of a group of upright fluid-pressure cylinders having pistons provided with wire-gripping chucks, fluid-pressure controlling means for said cylinders, automatic one-way wire-holding chucks located below the cylinders, wire cutters located above said cylinders, means for braiding a covering around the wires fed by said pistons, and means for automatically actuating the fluid-pressure controlling means, the cutters, and the braiding means.

38. In a wire-covering machine, the combination of a group of upright fluid-pressure cylinders having pistons provided with wire-gripping chucks, said pistons beginning their up-strokes at various heights in the respective cylinders, automatic wire holders below the cylinders, wire cutters located at different heights above the cylinders, means for braiding a covering around the group of wires fed by said pistons, and means for automatically co-ordinating the action of said fluid-pressure controlling means, said cutters, and said braiding means.

39. In a machine of the character described, the combination of means for applying a covering to a wire, an anterior cutter, and means for feeding wire thereto to be cut off and for holding the uncut portions against retraction, said means including a wire-gripping chuck comprising a female cone, a series of segmental externally-conical jaws movable axially and radially therein and formed on their inner faces with wire-gripping teeth, and an end abutment to limit the movement of said jaws out of the cone and insure their disengagement from the wire.

40. In a wire-covering machine, the combination of means for feeding individual wires to be covered, means for applying a covering around the group of wires, a group of cutters for severing said wires, each cutter having an oscillating blade, and means for simultaneously actuating the several said blades.

41. In a wire-covering machine, the combination of means for feeding individual wires to be covered, means for applying a covering around the group of wires, a group of cutters for severing said wires, each cutter having an oscillating blade, a series of rock-shafts attached to the respective blades and having gear pinions arranged in a circle, and an oscillatory gear common to said pinions for simultaneously actuating them.

42. In a machine of the character described, the combination of means for applying a cover to a wire, means for feeding a wire to a predetermined end position relative to said cover-applying means, and wire-cutting means positioned anterior to said cover-applying means, and including a supporting rod parallel to the line of feed, a cutter base-plate fixed to and adjustable longitudinally of said rod and provided with a wire-cutting portion, a movable cutting blade pivoted to said plate, and means for oscillating said movable blade.

43. In a wire-covering machine, the combination of a group of fluid-pressure cylinders having wire-feeding pistons, means for applying a covering to the wires fed by said pistons, a group of cutter-supporting rods mounted parallel to said cylinders and having cutters adjustable lengthwise of the rods, each cutter including a pivoted blade, a group of rock-shafts mounted parallel to said rods for oscillating said pivoted blades, and gearing for simultaneously oscillating the several rock-shafts.

44. In a wire-covering machine, the combination of a group of guides for a series of wires, means for braiding a covering about the group of wires issuing from said guides at a point posterior to the guides, a device for gathering the wires closely together at the braiding point, and means for opening and closing said device.

45. In a wire-covering machine, the combination of a group of wire guides relatively widely spaced about a center, means for braiding a covering upon the group of wires issuing from said guides, a pair of gathering jaws pivoted to close upon the wires for bunching them together at the braiding point, and means for automatically opening said jaws at predetermined intervals.

46. In a wire-covering machine, the combination of a group of wire guides, means for braiding a covering upon the group of wires issuing from said guides, a gathering device for bunching the wires at the braiding point, means for opening said device, a second group of wire guides, and means for moving said second group of guides, and when the gathering device is opened, into and out of the space which is occupied by the gathering device when the latter is closed.

47. In a wire-covering machine, the combination of a group of fixed wire guides, means for braiding a covering around the group of wires issuing from said guides, and a set of movable wire guides having an operative position surrounding the braiding point, and an inoperative position remote from said point.

48. In a wire-covering machine, the combination of a set of fixed upright wire guides, means for feeding wires upwardly there-through, means for braiding a covering about the issuing wires at a point above said guides, a pair of gathering jaws for bunching the wires at the braiding point, means for opening and closing said jaws, a set of movable wire guides inoperatively positioned above the braiding point, and means for projecting said movable guides downwardly between the gathering jaws when the latter are open.

49. In a wire-covering machine, the combination of a wire-covering braider, a feeder for drawing the work there-through, means for feeding a set of wires into operative relation with said braider, a set of guides for guiding the leading ends of the wires past the braiding point, said guides being longitudinally open on their inner sides and substantially pointed at their anterior ends, and means for moving said guides into and out of the braiding shed.

50. In a wire-covering machine, the combination of means for intermittently feeding wires in successive groups, means for braiding a covering sheath on each group, means for cutting off the wires, a work feeder timed to advance the work in such manner that the leading ends of a group about to be covered will overlap the posterior ends of the wires in the preceding covered unit, and means operatively positioned around the braiding point for guiding said leading ends past said point and inoperatively positioned at a location beyond the braiding point.

51. In a wire-covering machine, the combination of a group of wire feeders adapted intermittently to propel a set of wires upwardly, means located above said feeders for braiding a covering around the group of wires, means for cutting off the wires, gathering jaws for bunching the wires at the braiding point, means for opening and closing said jaws, means for guiding the leading ends of the said wires past the braiding point, and means for automatically co-ordinating the action of the several said instrumentalities.

52. In a wire-covering machine, the combination of means for braiding a covering sheath upon the intermediate portion of a group of wires, and means co-ordinated therewith for automatically drawing the loose posterior ends of said wires through the braiding shed to permit the braiding of a finishing end upon said sheath.

53. In a wire-covering machine, the combination of means for automatically assembling a group of wires about a core strand, means for automatically braiding a covering sheath upon the intermediate portion of said group of wires, and means for automatically drawing the posterior portions of said wires through the braiding shed to permit the continuance of braiding directly upon said core strand.

54. In a wire-covering machine, the combination of means for automatically assembling a group of wires, means for automatically braiding a body sheath upon the intermediate portion of said group, a series of hooks movable through the braiding shed for drawing the posterior ends of the wires out through said shed, and means for automatically imparting to said hooks a projecting and retracting movement co-ordinated with the action of the assembling and braiding means.

55. In a wire-covering machine, the combination of means for automatically assembling a group of wires, means for automatically braiding a body sheath thereon, a hook adapted to draw the posterior end of a wire through the braiding shed, a fluid-pressure cylinder and piston for operating said hook, and means co-ordinated with the action of said assembling and braiding means for automatically controlling the admission of pressure fluid to and its exhaust from said cylinder.

56. In a wire-covering machine, the combination of means for assembling a group of wires, means for braiding a covering sheath thereon, a hook movable through the braiding shed for drawing an end of a wire out therethrough, a latch for said hook to guard its end from catching on the braiding threads during the retracting movement thereof, and means actuated by the projecting and retracting movements of said hook for operating said latch.

57. In a wire-covering machine, the combination of means for assembling a group of wires, means for braiding a cover sheath thereon, a hook movable through the braiding shed and provided with a pivoted latch, a rod on said latch formed with a cam off-set, and a station-guide member for said rod.

58. In a wire-covering machine, the combination of means for assembling a group of wires, means for braiding a cover sheath thereon, a group of fluid-pressure cylinders whose axes substantially converge at a point anterior to the braiding point, pistons in said cylinders, rods attached to said pistons and provided with hooks adapted to pass through the braiding shed, and means for controlling the admission of pressure fluid to and its exhaust from said cylinders.

59. In a wire-covering machine, the combination of means for feeding and guiding a core strand, means for intermittently feeding a group of wires and assembling them about said core strand, means for braiding a cover sheath about the group of wires, means for cutting off the wires, means for drawing the posterior ends of the wires through the braiding shed, and means for automatically co-ordinating the action of the several said instrumentalities.

60. In a wire-covering machine, the combination of means for guiding and feeding upwardly a core strand, a series of upright wire feeders grouped about the path of said strand, wire cutters located above said feeders, means for braiding a cover sheath upon the wires, a group of hooks movable on lines converging below the brading point for drawing the posterior ends of the several wires through the braiding shed to permit a continuance of braiding upon the core strand at the lower end of the body sheath, means for operating said hooks, and means for automatically co-ordinating the action of the several said instrumentalities.

61. In a wire-covering machine, the combination of a group of upright wire feeders, automatic one-way wire-holding chucks below said feeders, wire cutters above said feeders, a sheath braider operative at a point above the wire cutters, a wire gathering device for bunching the wires at the braiding point, means for opening and closing said device, a group of guides adapted to be lowered and raised through the braiding shed while said device is open for guiding the leading ends of the wires past the braiding point, a group of hooks adapted to be lowered and raised through the braiding shed for drawing the posterior ends of the wires through and above said shed, and means for operating the several said instrumentalities in a predetermined order and relation.

62. In a wire-covering machine, the combination of means for feeding a group of wires, means for cutting them off, a braider for forming a sheath about the group of wires, a shaft having means for controlling the wire feeders and cutters, a second shaft having a clutch controlled by an element on the first shaft for operating the braider, and a second clutch on said second shaft for operating the first shaft.

63. In a wire-covering machine, the combination of a group of wire feeders, a group of wire cutters, a braider for forming a sheath about the wires, a work feeder, means for guiding the leading ends of the wires past the braiding point, means for gathering the wires together at the braiding point, means for drawing the posterior ends of the severed wires through the braiding shed, and means including a shaft having cam members for co-ordinating the action of the several said instrumentalities.

64. In a wire-covering machine, the combination of a group of upright wire feeders, a group of wire cutters above the same, means for braiding a cover sheath about the group of wires, a work feeder for drawing the work upwardly during braiding, a group of hooks for drawing the posterior ends of the wires through and above the braiding shed, means for operating the several said instrumentalities, and means for co-ordinating their action substantially in the following order of operations from the braiding of a sheath connecting two adjacent units, viz: (1) stop work feed while braiding continues, (2) stop braiding, (3) elevate wires, (4) start braiding while work feed is suspended, (5) start work feed and braid body sheath on group of wires, (6) stop work feed and stop braiding, (7) cut wires, (8) lower and raise hooks, (9) start braiding and (10) start work feed.

65. In a wire-covering machine, the combination of a group of wire-feeding cylinders and pistons, a controlling valve therefor, a group of wire cutters, a braider, a wire gatherer adapted to be opened and closed, a set of wire guides adapted to enter the braiding shed when said gatherer is open, a set of hooks adapted to draw the posterior ends of the wires out through the braiding shed, operating pistons and cylinders for said hooks, a controlling valve for said cylinders, a work feeder, and a rotary shaft having cam devices adapted to co-ordinate the action of the several-said instrumentalities substantially in the following order of operations from the braiding of the connecting sheath between adjacent units, viz: (1) stop work feed, (2) stop braiding, (3) project wire guides into operative position, (4) elevate wires, (5) retract wire guides, (6) close wire gatherer, (7) start braiding, (8) start work feed, (9) retract wire-feeding pistons, (10) stop work feed, (11) stop braiding, (12) cut wires, (13) open gatherer, (14) project hooks, (15) retract hooks, (16) start braiding and (17) start work feed.

66. In a wire-covering apparatus, the combination of mechanism for assembling and covering a group of wires, and means responsive to the tension on said wires for automatically applying a propelling force thereto.

67. In a wire-covering apparatus, the combination of mechanism for feeding a wire and applying a covering thereto, and means for supplying the wire to said mechanism comprising a wire spool, a power-operated wheel for propelling the wire from said spool, and means for holding the wire in contact with said wheel with a pressure which varies according to the draft upon the wire.

68. In a wire-covering apparatus, the combination of mechanism for feeding a group of wires and applying a covering thereto, a series of spools for supplying the wire to said mechanism, a power-operated shaft having means for drawing the wires from said spools, and means for holding the wires in contact with said drawing means with a pressure which varies according to the draft upon the wires.

69. In a wire-covering apparatus the combination of mechanism for feeding a wire and applying a cover thereto and means for supplying the wire to said mechanism comprising a wire spool, a power operated wheel for drawing the wire from said spool, and a pair of guide-rollers so positioned relative to said wheel as to cause the wire to pass substantially around said wheel.

70. In a wire-covering apparatus, the combination of mechanism for feeding and covering a wire, a shipper controlling the drive of said mechanism, a wire-supplying spool, and a pivoted arm responsive in one direction to a failure of the tension on the wire and in the opposite direction to the presence of a kink in said wire for controlling said shipper to stop the machine when the wire runs out or when a kink is encountered therein.

71. In a wire-covering apparatus, the combination of means for feeding a wire to a position to be covered, means for covering the wire, and means responsive to the draft on the wire caused by said feeding means for propelling the wire as it approaches said feeding means.

72. In a wire-covering apparatus, the combination of means for automatically assembling a group of wires, means for braiding a covering thereon, a frictional feeder for drawing the work through the braiding means, rotary means for applying frictional propulsion to the wires approaching the assembling means, and means responsive to the tension on the wires for varying their contact with said rotary means.

73. In a wire-covering apparatus, the combination of means for automatically assembling a group of wires, means for braiding a covering thereon, a work feeder, a wire-propelling friction drum having a variable contact with the wires, and tension means for bearing against the wires and variable in position according to the draft produced by said work feeder.

74. In a wire-covering apparatus, the combination of mechanism for automatically assembling and covering a series of wires including wire feeders, a braider, a work feeder, and wire cutters, and wire-supplying and stop-motion devices including a series of wire spools, frictional wire-propelling means, a series of counterbalanced arms having members engaging the respective wires for varying the contact of the latter with the propelling means according to the draft caused by said wire feeders and work feeder, and means controlled by said arms for automatically stopping said mechanism on the occurrence of an abnormal condition of the wires.

In witness whereof I have hereunto set my hand this 5th day of May, 1920.

ERNEST A. PIGEON.